United States Patent [19]

Tanaka et al.

[11] Patent Number: 5,621,873
[45] Date of Patent: Apr. 15, 1997

[54] DOCUMENT PROCESSING WITH SIMPLIFIED INPUT AND EDITING OF FORMAT INFORMATION

[75] Inventors: Kensaku Tanaka, Yokohama; Naohiro Yoshikawa, Kawasaki; Yasuhiro Watanabe, Yokohama, all of Japan

[73] Assignee: Canon Kabushiki Kaisha, Tokyo, Japan

[21] Appl. No.: 450,134

[22] Filed: May 25, 1995

Related U.S. Application Data

[63] Continuation of Ser. No. 126,026, Sep. 24, 1993, abandoned, which is a continuation of Ser. No. 575,880, Aug. 31, 1990, abandoned.

[30] Foreign Application Priority Data

Aug. 31, 1989 [JP] Japan .................................. 1-225351
Nov. 16, 1989 [JP] Japan .................................. 1-299057

[51] Int. Cl.$^6$ .................................................. G06T 1/00
[52] U.S. Cl. .......................... 395/779; 395/109; 395/131; 358/453
[58] Field of Search ................................ 395/144–149, 395/109, 131, 135; 345/23, 112–118, 150, 185–191; 358/453, 500; 355/326–328

[56] References Cited

U.S. PATENT DOCUMENTS

| | | | |
|---|---|---|---|
| 4,460,975 | 7/1984 | Torkelson et al. | 395/148 |
| 4,760,458 | 7/1988 | Watanabe et al. | 358/537 |
| 4,802,104 | 1/1989 | Ogiso | 395/153 |
| 4,807,142 | 2/1989 | Agarwal | 395/145 |
| 4,853,878 | 8/1989 | Brown | 395/145 |
| 4,857,955 | 8/1989 | Crandall | 355/328 |
| 4,905,097 | 2/1990 | Watanabe et al. | 358/456 |
| 4,924,411 | 5/1990 | Kashiwagi | 395/145 |
| 4,949,287 | 8/1990 | Yamaguchi et al. | 395/147 |
| 4,951,233 | 8/1990 | Fujiwara et al. | 395/148 |
| 4,992,780 | 2/1991 | Penna et al. | 345/139 |
| 5,018,083 | 5/1991 | Watanabe et al. | 395/147 |
| 5,020,004 | 5/1991 | Igarashi | 395/109 |
| 5,021,972 | 6/1991 | Nishi | 395/145 |
| 5,050,099 | 9/1991 | Nishihara | 395/109 |
| 5,113,251 | 5/1992 | Ichiyanagi et al. | 358/500 |

FOREIGN PATENT DOCUMENTS 250777  1/1988  European Pat. Off. .

OTHER PUBLICATIONS

Xerox Ventura Publisher Reference Guide (pp. 2–1, 2–2, 5–97, 5–98, 5–122, 5–123, F–7, and J–1 through J–6), 1988.

*Primary Examiner*—Joseph H. Feild
*Attorney, Agent, or Firm*—Fitzpatrick, Cella, Harper & Scinto

[57] ABSTRACT

Format information, including e.g. color information and a plurality of format elements for permitting output of document information in a desired layout is stored, and the document information is output in accordance with the stored format information.

30 Claims, 36 Drawing Sheets

FIG. 8A

| TITLE | SAMPLE DOCUMENT 1 |
|---|---|

TOP EDGE ☐ mm
BACK MARGIN ☐ mm

NO OF COLS. ☐
WIDTH OF COL. ☐ mm
HEIGHT OF COL. ☐ mm
INTER-COL. SPACE ☐ mm

| CHR | SIZE | LINE SPACE | STYLE | LINE TABLE | | | |
|---|---|---|---|---|---|---|---|
| BODY | ☐ | P ☐ P | ☐ | LEFT | RIGHT | CENTER | ADJUST |
| BIG HEADLINE | ☐ | P ☐ P | ☐ | LEFT | RIGHT | CENTER | ADJUST |
| HEADLINE | ☐ | P ☐ P | ☐ | LEFT | RIGHT | CENTER | ADJUST |
| SUBHEAD 1 | ☐ | P ☐ P | ☐ | LEFT | RIGHT | CENTER | ADJUST |
| SUBHEAD 2 | ☐ | P ☐ P | ☐ | LEFT | RIGHT | CENTER | ADJUST |
| SUBHEAD 3 | ☐ | P ☐ P | ☐ | LEFT | RIGHT | CENTER | ADJUST |
| CATCHWORD 1 | ☐ | P ☐ P | ☐ | LEFT | RIGHT | CENTER | ADJUST |
| CATCHWORD 2 | ☐ | P ☐ P | ☐ | LEFT | RIGHT | CENTER | ADJUST |
| CATCHWORD 3 | ☐ | P ☐ P | ☐ | LEFT | RIGHT | CENTER | ADJUST |
| PAGING | ☐ | P | ☐ | LEFT | RIGHT | CENTER | ADJUST |

COLOR OF CHR   PALETTE NO.   COLOR NO.
251 ☐   252 ☐

FIG. 8C

| | | | | | | |
|---|---|---|---|---|---|---|
| TITLE | SAMPLE DOCUMENT 1 | | | | | |

TOP EDGE ☐ mm
BACK MARGIN ☐ mm

NO OF COLS. ☐
WIDTH OF COL. ☐ mm
HEIGHT OF COL. ☐ mm
INTER-COL. SPACE ☐ mm

| CHR | SIZE | LINE SPACE | STYLE | LINE TABLE | | | |
|---|---|---|---|---|---|---|---|
| BODY | ☐ | ☐ P | ☐ P | LEFT | RIGHT | CENTER | ADJUST |
| BIG HEADLINE | ☐ | ☐ P | ☐ P | LEFT | RIGHT | CENTER | ADJUST |
| HEADLINE | ☐ | ☐ P | ☐ P | LEFT | RIGHT | CENTER | ADJUST |
| SUBHEAD 1 | ☐ | ☐ P | ☐ P | LEFT | RIGHT | CENTER | ADJUST |
| SUBHEAD 2 | ☐ | ☐ P | ☐ P | LEFT | RIGHT | CENTER | ADJUST |
| SUBHEAD 3 | ☐ | ☐ P | ☐ P | LEFT | RIGHT | CENTER | ADJUST |
| CATCHWORD 1 | ☐ | ☐ P | ☐ P | LEFT | RIGHT | CENTER | ADJUST |
| CATCHWORD 2 | ☐ | ☐ P | ☐ P | LEFT | RIGHT | CENTER | ADJUST |
| CATCHWORD 3 | ☐ | ☐ P | ☐ P | LEFT | RIGHT | CENTER | ADJUST |
| PAGING | ☐ | ☐ P | | LEFT | RIGHT | CENTER | ADJUST |

COLOR OF CHR ☐

FIG. 9

| TITLE | SAMPLE DOCUMENT 1 |
|---|---|

TOP EDGE ☐ mm
BACK MARGIN ☐ mm

NO OF COLS. ☐
WIDTH OF COL. ☐ mm
HEIGHT OF COL. ☐ mm
INTER-COL. SPACE ☐ mm

| CHR | SIZE | LINE SPACE | STYLE | LINE TABLE | | | |
|---|---|---|---|---|---|---|---|
| BODY | ☐ | ☐ P | ☐ P | ☐ | LEFT | RIGHT | CENTER | ADJUST |
| BIG HEADLINE | ☐ | ☐ P | ☐ P | ☐ | LEFT | RIGHT | CENTER | ADJUST |
| HEADLINE | ☐ | ☐ P | ☐ P | ☐ | LEFT | RIGHT | CENTER | ADJUST |
| SUBHEAD 1 | ☐ | ☐ P | ☐ P | ☐ | LEFT | RIGHT | CENTER | ADJUST |
| SUBHEAD 2 | ☐ | ☐ P | ☐ P | ☐ | LEFT | RIGHT | CENTER | ADJUST |
| SUBHEAD 3 | ☐ | ☐ P | ☐ P | ☐ | LEFT | RIGHT | CENTER | ADJUST |
| CATCHWORD 1 | ☐ | ☐ P | ☐ P | ☐ | LEFT | RIGHT | CENTER | ADJUST |
| CATCHWORD 2 | ☐ | ☐ P | ☐ P | ☐ | LEFT | RIGHT | CENTER | ADJUST |
| CATCHWORD 3 | ☐ | ☐ P | ☐ P | ☐ | LEFT | RIGHT | CENTER | ADJUST |
| PAGING | ☐ | ☐ P | | | LEFT | RIGHT | CENTER | ADJUST |

| COLOR OF CHR | PALETTE NO. | COLOR NO. |
|---|---|---|
| BODY | ☐ | ☐ |
| BIG HEADLINE | ☐ | ☐ |
| HEADLINE | ☐ | ☐ |
| SUBHEAD 1 | ☐ | ☐ |
| SUBHEAD 2 | ☐ | ☐ |
| SUBHEAD 3 | ☐ | ☐ |
| CATCHWORD 1 | ☐ | ☐ |
| CATCHWORD 2 | ☐ | ☐ |
| CATCHWORD 3 | ☐ | ☐ |
| PAGING | ☐ ~251 | ☐ ~252 |

FIG. 11

| | | | | | |
|---|---|---|---|---|---|
| TITLE | SAMPLE DOCUMENT 1 | | | | |

TOP EDGE ☐ mm
BACK MARGIN ☐ mm

NO OF COLS. ☐
WIDTH OF COL. ☐ mm
HEIGHT OF COL. ☐ mm
INTER-COL. SPACE ☐ mm

| CHR | SIZE | LINE SPACE | STYLE | LINE TABLE | | | |
|---|---|---|---|---|---|---|---|
| BODY | ☐ P | ☐ P | ☐ | LEFT | RIGHT | CENTER | ADJUST |
| BIG HEADLINE | ☐ P | ☐ P | ☐ | LEFT | RIGHT | CENTER | ADJUST |
| HEADLINE | ☐ P | ☐ P | ☐ | LEFT | RIGHT | CENTER | ADJUST |
| SUBHEAD 1 | ☐ P | ☐ P | ☐ | LEFT | RIGHT | CENTER | ADJUST |
| SUBHEAD 2 | ☐ P | ☐ P | ☐ | LEFT | RIGHT | CENTER | ADJUST |
| SUBHEAD 3 | ☐ P | ☐ P | ☐ | LEFT | RIGHT | CENTER | ADJUST |
| CATCHWORD 1 | ☐ P | ☐ P | ☐ | LEFT | RIGHT | CENTER | ADJUST |
| CATCHWORD 2 | ☐ P | ☐ P | ☐ | LEFT | RIGHT | CENTER | ADJUST |
| CATCHWORD 3 | ☐ P | ☐ P | ☐ | LEFT | RIGHT | CENTER | ADJUST |
| PAGING | ☐ P | | | LEFT | RIGHT | CENTER | ADJUST |

COLOR OF CHR

BODY ☐
BIG HEADLINE ☐
HEADLINE ☐
SUBHEAD 1 ☐
SUBHEAD 2 ☐
SUBHEAD 3 ☐
CATCHWORD 1 ☐
CATCHWORD 2 ☐
CATCHWORD 3 ☐
PAGING ☐

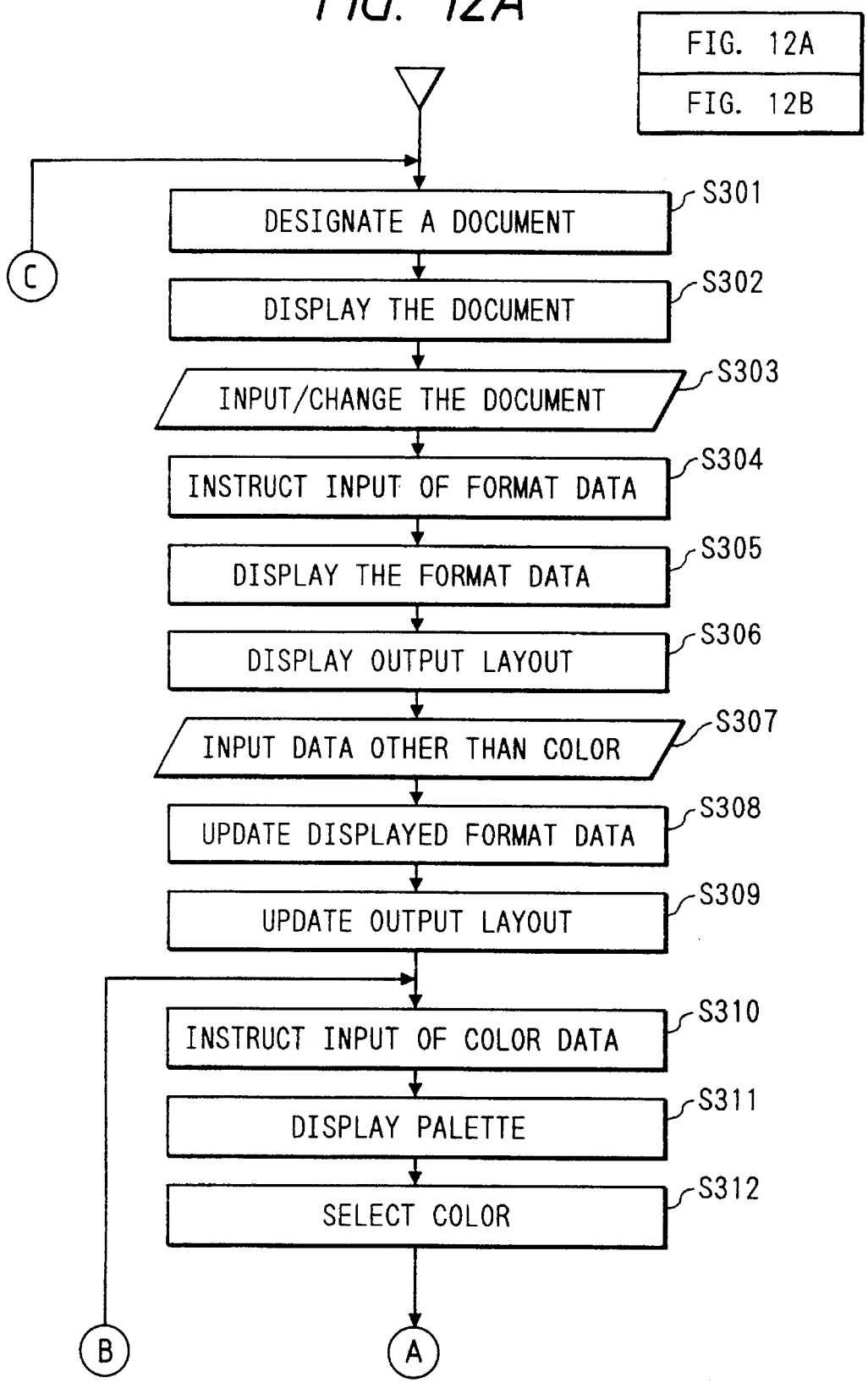

FIG. 16

| TITLE | | | SAMPLE DOCUMENT 1 | | | |
|---|---|---|---|---|---|---|

TOP EDGE ☐ mm
BACK MARGIN ☐ mm

NO OF COLS. ☐
WIDTH OF COL. ☐ mm
HEIGHT OF COL. ☐ mm
INTER-COL. SPACE ☐ mm

| CHR | SIZE | LINE SPACE | STYLE | LINE TABLE | | | |
|---|---|---|---|---|---|---|---|
| BODY | ☐ P | ☐ P | ☐ | LEFT | RIGHT | CENTER | ADJUST |
| BIG HEADLINE | ☐ P | ☐ P | ☐ | LEFT | RIGHT | CENTER | ADJUST |
| HEADLINE | ☐ P | ☐ P | ☐ | LEFT | RIGHT | CENTER | ADJUST |
| SUBHEAD 1 | ☐ P | ☐ P | ☐ | LEFT | RIGHT | CENTER | ADJUST |
| SUBHEAD 2 | ☐ P | ☐ P | ☐ | LEFT | RIGHT | CENTER | ADJUST |
| SUBHEAD 3 | ☐ P | ☐ P | ☐ | LEFT | RIGHT | CENTER | ADJUST |
| CATCHWORD 1 | ☐ P | ☐ P | ☐ | LEFT | RIGHT | CENTER | ADJUST |
| CATCHWORD 2 | ☐ P | ☐ P | ☐ | LEFT | RIGHT | CENTER | ADJUST |
| CATCHWORD 3 | ☐ P | ☐ P | ☐ | LEFT | RIGHT | CENTER | ADJUST |
| PAGING | ☐ P | | | LEFT | RIGHT | CENTER | ADJUST |

COLOR OF CHR    PALETTE NO.    COLOR NO.

251 ☐    252 ☐    253 — SUCCEEDING FORMAT
                  254 — PRECEDING FORMAT

FIG. 18

| TITLE | SAMPLE DOCUMENT 1 |
|---|---|

TOP EDGE  ☐ mm
BACK MARGIN  ☐ mm

NO OF COLS.  ☐
WIDTH OF COL.  ☐ mm
HEIGHT OF COL.  ☐ mm
INTER-COL. SPACE  ☐ mm

| CHR | SIZE | LINE SPACE | STYLE | LINE TABLE | | | |
|---|---|---|---|---|---|---|---|
| BODY | ☐ | ☐ P | ☐ P | LEFT | RIGHT | CENTER | ADJUST |
| BIG HEADLINE | ☐ | ☐ P | ☐ P | LEFT | RIGHT | CENTER | ADJUST |
| HEADLINE | ☐ | ☐ P | ☐ P | LEFT | RIGHT | CENTER | ADJUST |
| SUBHEAD 1 | ☐ | ☐ P | ☐ P | LEFT | RIGHT | CENTER | ADJUST |
| SUBHEAD 2 | ☐ | ☐ P | ☐ P | LEFT | RIGHT | CENTER | ADJUST |
| SUBHEAD 3 | ☐ | ☐ P | ☐ P | LEFT | RIGHT | CENTER | ADJUST |
| CATCHWORD 1 | ☐ | ☐ P | ☐ P | LEFT | RIGHT | CENTER | ADJUST |
| CATCHWORD 2 | ☐ | ☐ P | ☐ P | LEFT | RIGHT | CENTER | ADJUST |
| CATCHWORD 3 | ☐ | ☐ P | ☐ P | LEFT | RIGHT | CENTER | ADJUST |
| PAGING | ☐ | ☐ P | | LEFT | RIGHT | CENTER | ADJUST |

COLOR OF CHR  ☐

253 — SUCCEEDING FORMAT
254 — PRECEDING FORMAT

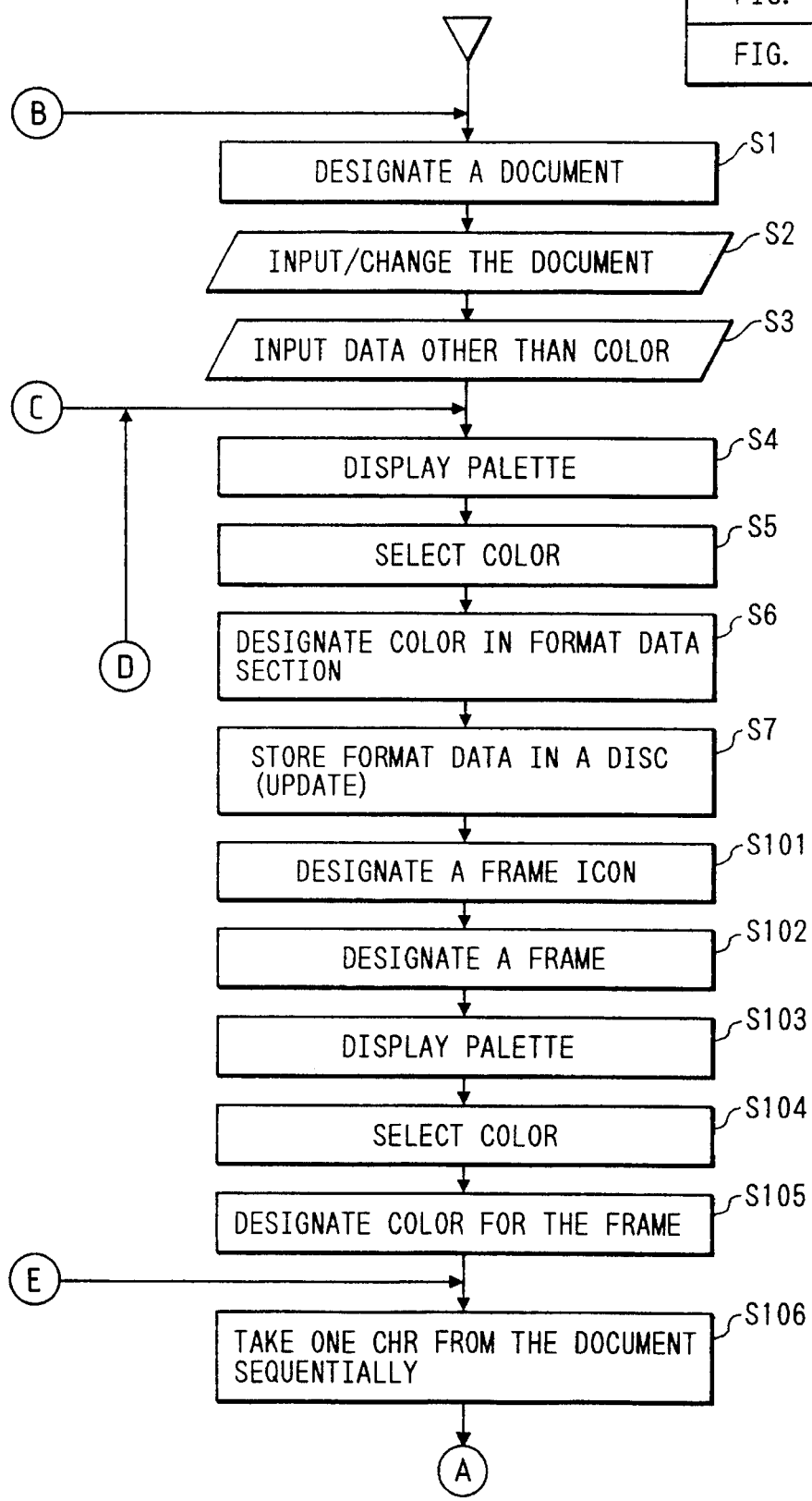

| RECTANGULAR | START | FROM TOP | [      ] mm |
| | | FROM BACK | [      ] mm |
| | END | FROM TOP | [      ] mm |
| | | FROM BACK | [      ] mm |
| COLOR OF CHR. | PALETTE NO. [    ] | COLOR NO. [    ] | |

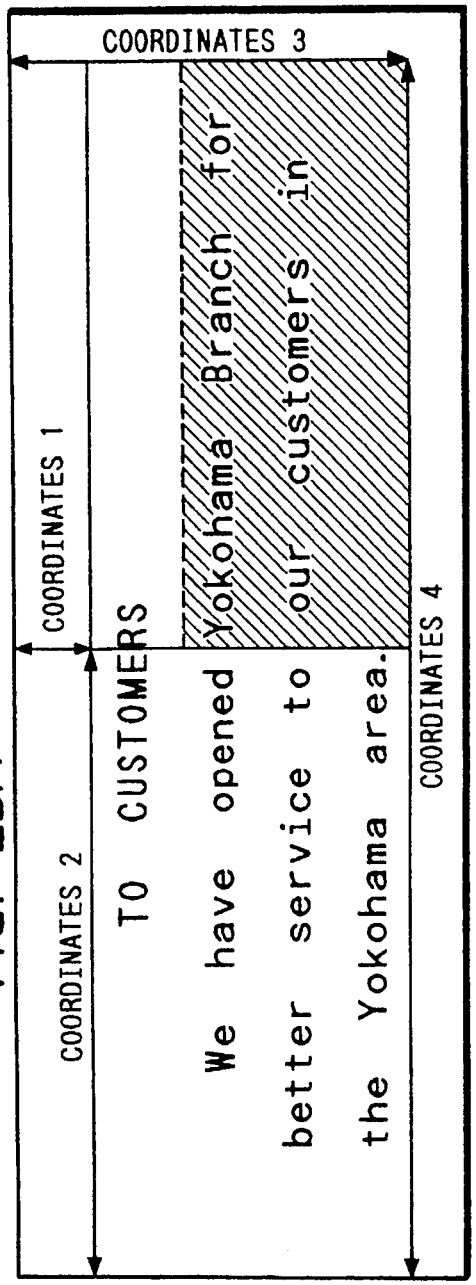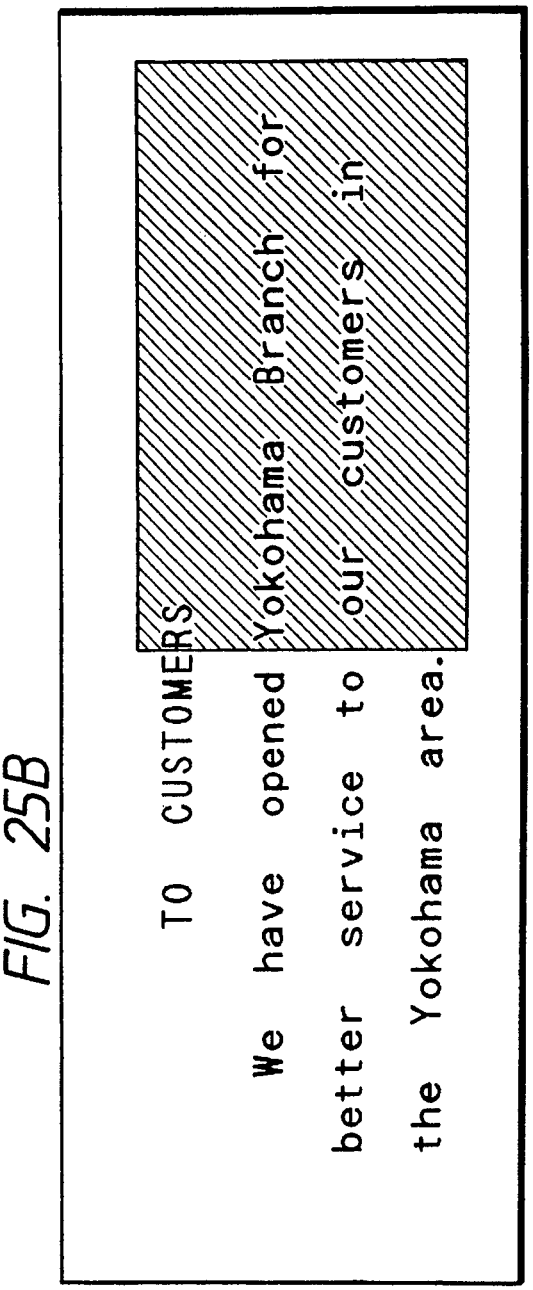

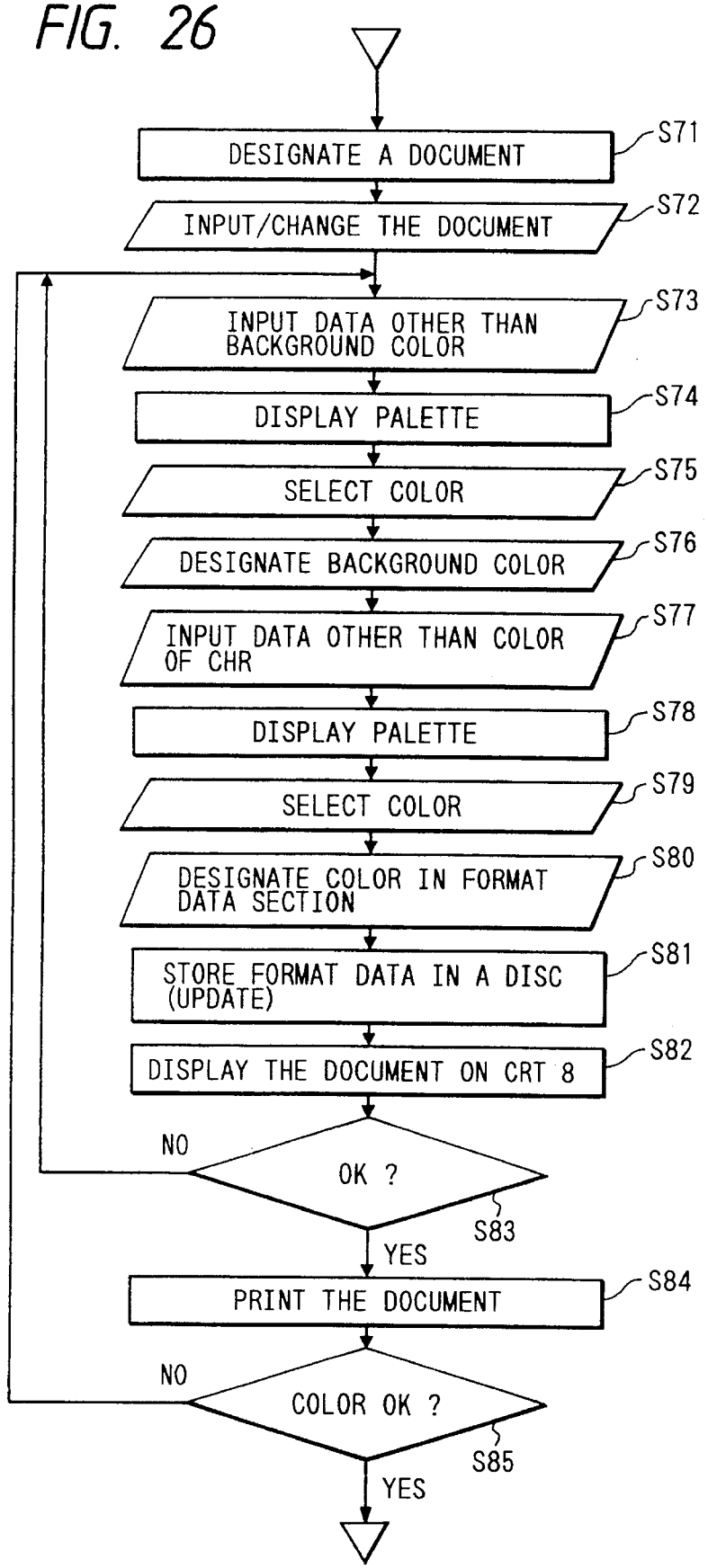

FIG. 27

| TITLE | SAMPLE DOCUMENT 1 | | |
|---|---|---|---|
| SHEET SIZE | A3  297×420 | B4  257×364 | |
| | A4  210×297 | B5  182×257 | |
| | A5  148×210 | OTHERS  210×297 | |
| SHEET DIRECTION | PORTRAIT | LANDSCAPE | |
| PRINT | ONE SIDE | TWO SIDES | COVERED BINDING |
| BACKGROUND COLOR | PALETTE NO. ~251 | COLOR NO. ~252 | |

DOCUMENT PROCESSING WITH SIMPLIFIED INPUT AND EDITING OF FORMAT INFORMATION

This application is a continuation of application Ser. No. 08/126,026 filed Sep. 24, 1993, which was a continuation of application Ser. No. 07/575,880 filed Aug. 31, 1990, both now abandoned.

BACKGROUND OF THE INVENTION

1. Field of the Invention

The present invention relates to a document, processing apparatus, and more particularly to a document processing apparatus which sets up types for, and edits a document based on format information, to produce a color output.

2. Related Background Art

In the past, a method of having document format information separately from document data and modifying an output format of the document by merely modifying the format information has been known as a method of typesetting, editing and outputting a document in a high-class document processing apparatus. An apparatus which has means for storing a body of such format commands as a library, visually guessing contents of the format information and selecting one of them has also been known, but color information is not included in the format information in said apparatus.

In the prior art, since the color information is not included in the format information, it is not possible to collectively modify character colors of the output document by modifying the format.

Even if format information which includes color information is adopted in the above prior-art system, the setting of the content of the format information cannot be visually confirmed, and the format resulting from a modification of the original format is not detectable.

In the prior art, it is not easy to select from the body of possible format commands, including color information, to output a document with the desired appearance.

SUMMARY OF THE INVENTION

It is an aspect of the present invention to provide a document processing apparatus comprising storing format information including color information and a plurality of format elements for permitting output of document information in a desired layout, and output means for outputting the document information in accordance with the stored format information.

It is another aspect of the present invention to provide a document processing apparatus comprising storing format information including color information and a plurality of format elements for permitting output of document information in a desired layout, and format memory means for storing a body of such format information. Preferably, it further comprises designation means for designating and reading desired format information.

It is another aspect of the present invention to provide a document processing apparatus comprising memory means for storing format information including color information and a plurality of format elements, setting means for setting a color condition when the document information is to be output, and output means for outputting the document information in accordance with the color condition set by the setting means. Preferably, the setting means instructs whether the document information is to be output monochromatically without regard to the color information included in the format information, or is to be output in accordance with the color information included in the format information.

It is another aspect of the present invention to provide a document processing apparatus comprising means for storing format information including color information and a plurality of format elements relating to document information to be outputted, and area information including the color information, decision means for determining whether the format information or the area information is to be dominant, and output means for outputting the document information in accordance with the dominant information determined by the decision means.

It is another aspect of the present invention to provide a document processing apparatus comprising means for storing format information including color information and format elements for outputting document information in a desired layout, and display control means for controlling a display of the output layout of the format information.

BRIEF DESCRIPTION OF THE DRAWINGS

FIG. 9 shows a first example of CRT display of the document format information in which the character code is multi-color, FIG. 11 shows a second example of CRT display of the document format information in which the character color is multi-color, FIG. 12, consisting of FIGS. 12A and 12B, shows a process for modifying a character color while an output format of a document is displayed, FIG. 16 shows a first example of CRT display of the document format information when the formats have been registered as a library, FIG. 18 shows a second example of CRT display of the document format information when the formats have been registered as the library, FIG. 25A shows a first example of CRT display of the frame attribute document, FIG. 25B shows a second example of CRT display of the frame attribute document, FIG. 26 shows a flow chart of a background color setting process, and FIG. 27 shows an example of CRT display of elements of the document format information which relates to a sheet.

DESCRIPTION OF THE PREFERRED EMBODIMENTS

Embodiment 1

[Collective modification of-character color (monochromatic) in a document]

A preferred embodiment of the present invention is now explained in detail with reference to the accompanying drawings.

Figure 1:
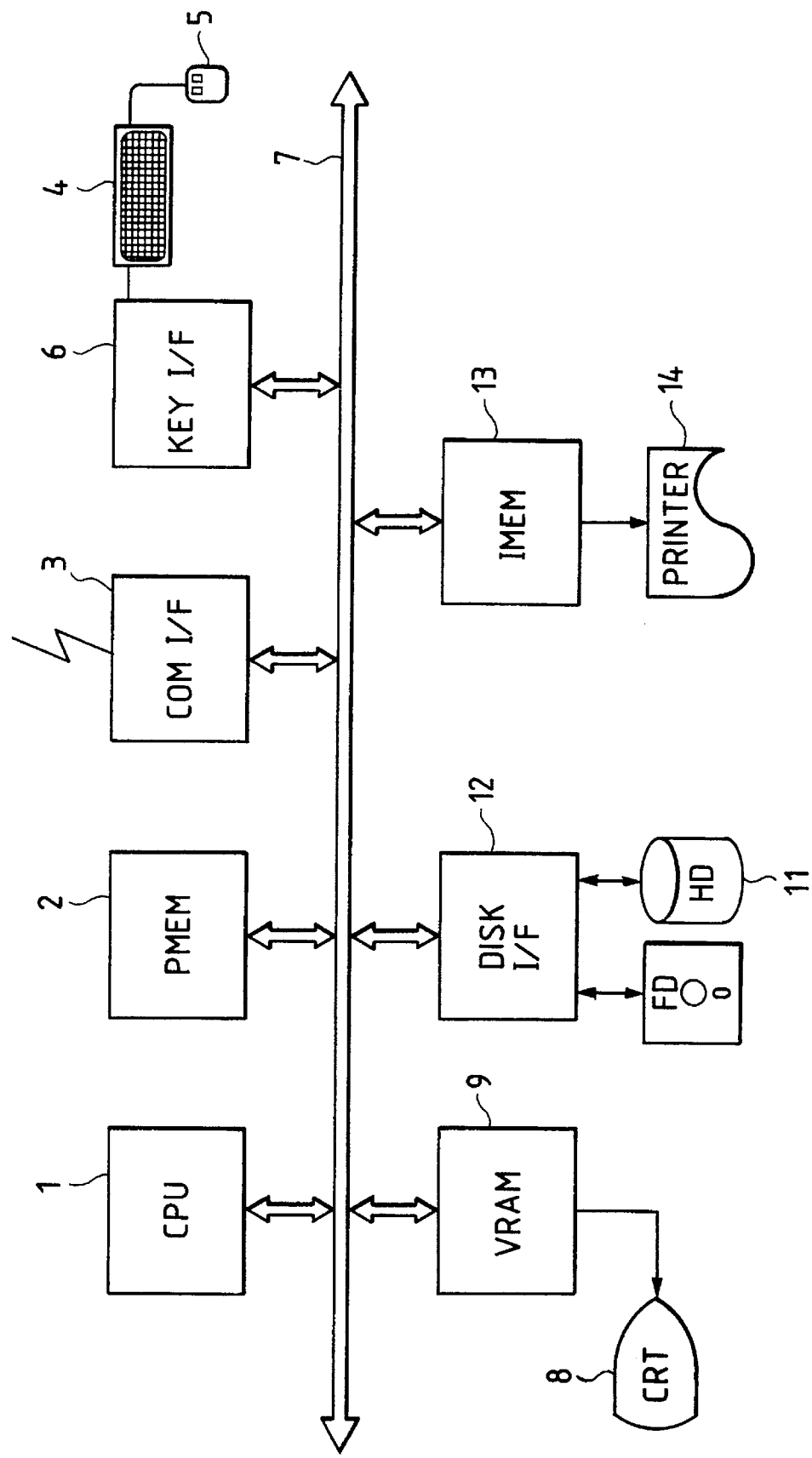
FIG. 1 shows a configuration of one embodiment of a document processing apparatus of the present invention.

FIG. 1 shows a first block diagram of a configuration of a document processing apparatus of the present embodiment. In FIG. 1, numeral 1 denotes a CPU which controls the operation of the overall system in accordance with a program on a PMEM 2 to be described later. The PMEM 2 is a program memory which stores a program such as that shown in the flow chart which shows a process flow of the present invention. Numeral 3 denotes a communication interface (I/F) which permits transmission/reception protocol such as RS232C. Numeral 4 denotes a keyboard, numeral 5 denotes a pointing device, numeral 6 denotes a keyboard interface (KEY I/F) which permits the connection of the keyboard and the pointing device, numeral 7 denotes a system bus which transmits an address signal and data and control signals in the system, numeral 8 denotes a color CRT, numeral 9 denotes a color video RAM (VRAM) which develops a 4 bits/pixel color screen to a color CRT, numeral 10 denotes a floppy disk drive, numeral 11 denotes a hard disk drive, numeral 12 denotes a disk interface (DISK I/F) which permits the connection of the floppy disk drive or the hard disk drive to the system bus 7, numeral 13 denotes a color image memory (IMEM) for storing color image data of 4 bits/pixel having a resolution of 400 dpi for developing a color image to be output to a color printer 14, having a resolution of 400 dpi.

Figure 2:
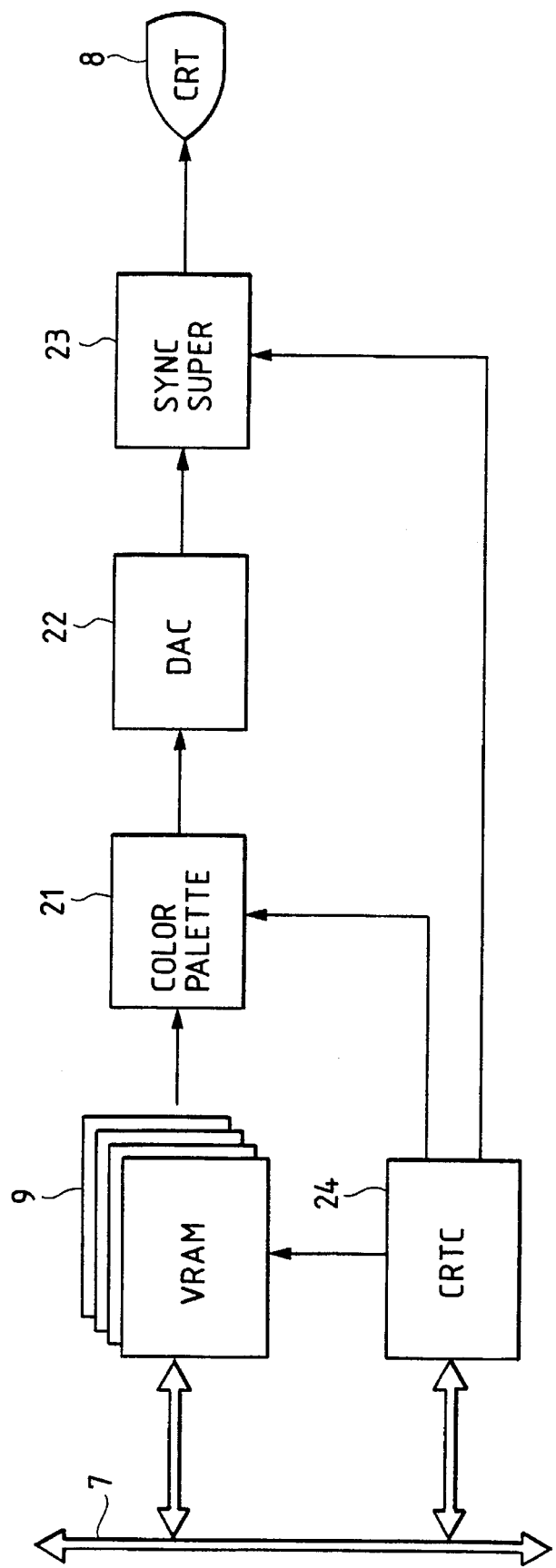
FIG. 2 shows a detailed configuration of a color CRT unit of FIG. 1.

FIG. 2 shows the configuration between the system bus 7 and the color CRT 8 of FIG. 1 in detail. In FIG. 2, numeral 9 denotes a video RAM (VRAM) which stores 4 bits/pixel color image data, numeral 21 denotes a color palette for selecting 16 colors out of 4096 colors, numeral 22 denotes a digital/analog converter (DAC) which converts 4-bits/color digital image signals for each of three color components red (R), green (G) and blue (B) to analog signals, numeral 23 denotes a synchronous signal superposition circuit for superimposing horizontal and vertical synchronous signals (HSYNC, VSYNC) for the CRT 8 on the green image signal, and numeral 24 denotes a CRT controller (CRTC) which controls the VRAM 9, the updating of the color palette 21 and the synchronous signal superposition circuit 23.

Figure 3:
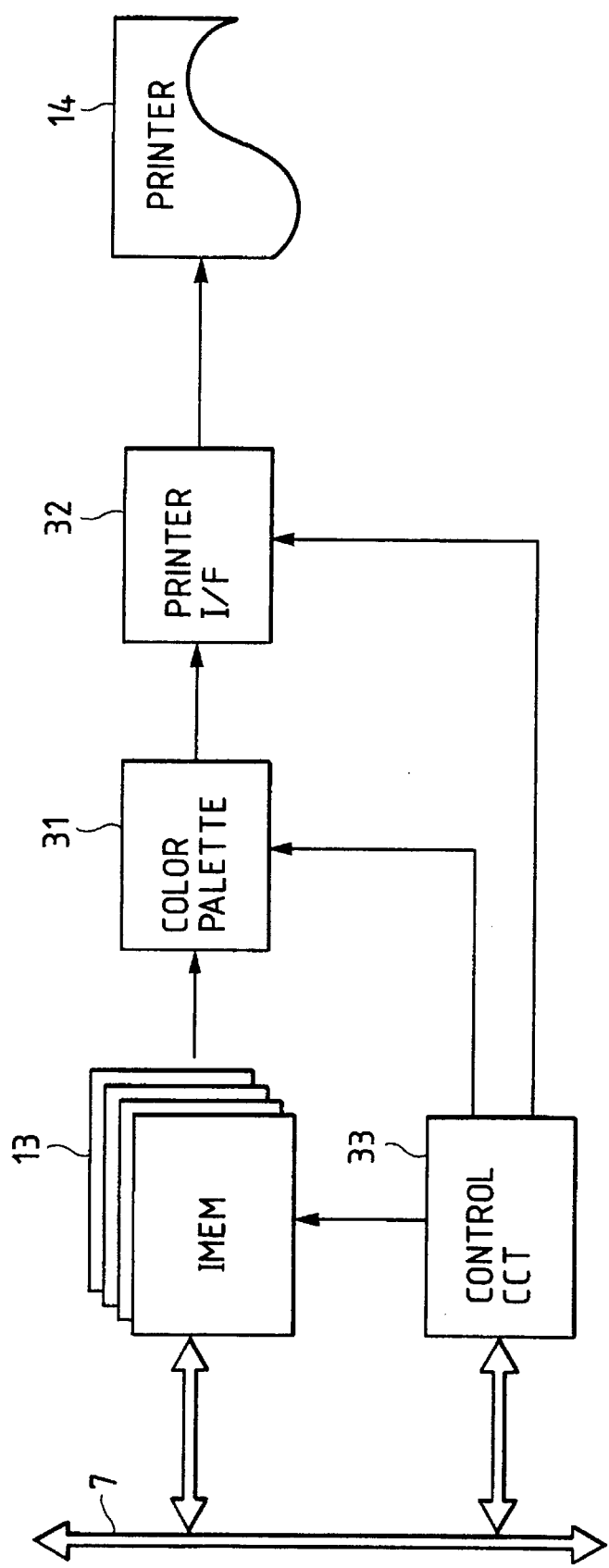
FIG. 3 shows a detailed configuration of a color printer unit of FIG. 1.

FIG. 3 shows a configuration between the system bus 7 and the color printer 14 of FIG. 1 in detail. In FIG. 3, numeral 13 denotes a color image memory (IMEM) for storing color image data of 4 bits/pixel and having a resolution of 400 dpi, numeral 31 denotes a color palette for selecting 16 colors out of 4096 colors, numeral 32 denotes a printer interface (I/F) for connecting the color printer 14, and numeral 33 denotes a control circuit which controls the IMEM 13 and the updating of the color palette 31 and sends a printer control signal to the printer I/F 32.

[Configuration of printer 14]

Figure 4:
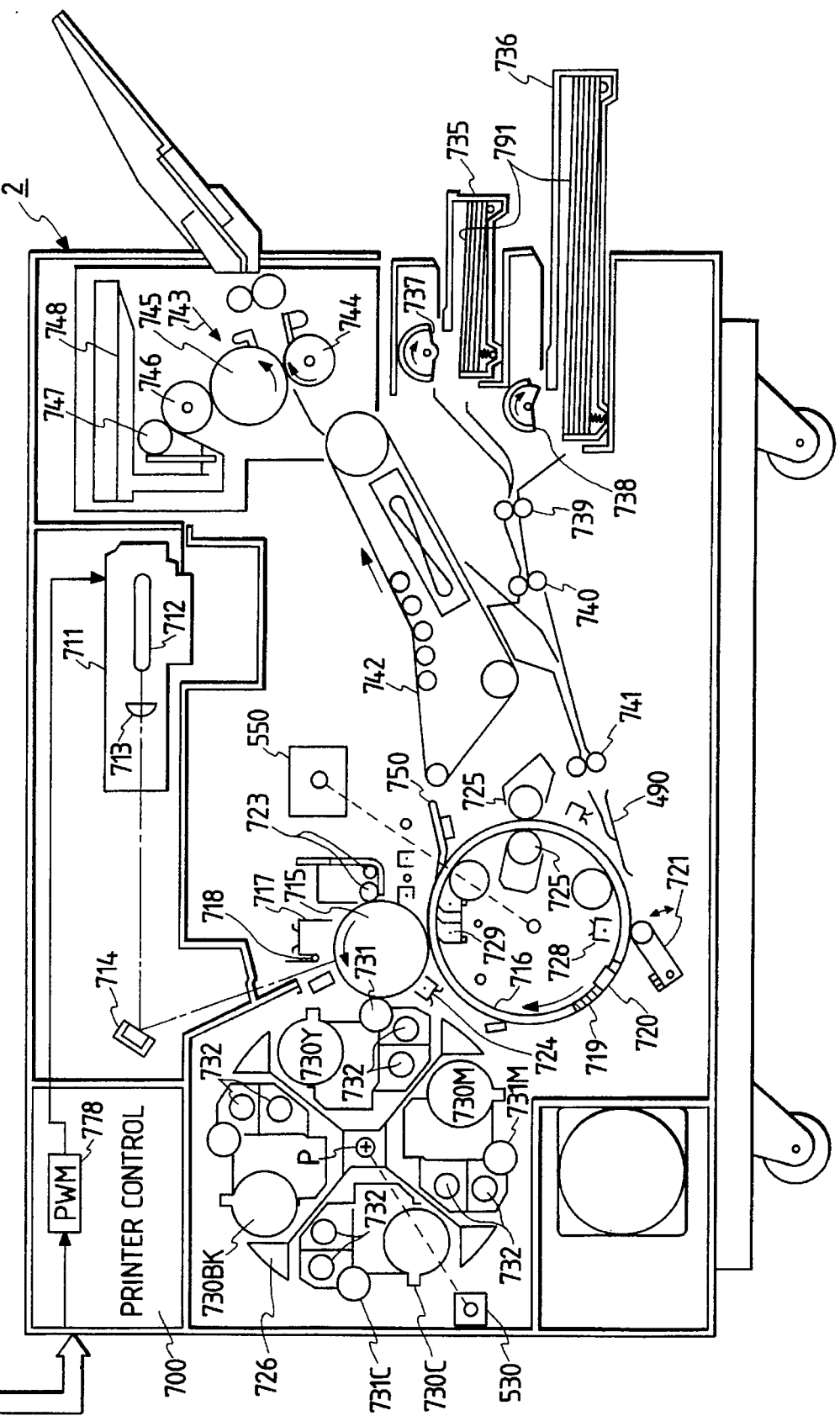
FIG. 4 shows a configuration of a color printer unit.

Referring to FIG. 4, an outline of the color printer 14 shown in FIGS. 1 and 3 is now explained. Numeral 778 denotes a pulse width modulator which converts a multi-value digital image signal from the printer I/F 32 shown in FIG. 3 to an analog image signal and compares the analog image signal with a ramp wave of a predetermined period to produce a pulse-width-modulated signal. The pulse width modulated signal is supplied to a laser output unit 711 in a succeeding stage, which on/off modulates a laser to form a half-tone image. Numeral 711 denotes a scanner which has a laser output unit for converting the image signal from the PWM 778 to a light signal, a polygonal mirror 712 having a shape such as an octagon, a motor (not shown) for rotating the mirror 712 and an f/θ lens (focusing lens) 713. Numeral 714 denotes a reflection mirror for altering a light path of a laser beam and numeral 715 denotes a photoconductor drum. The laser beam emitted from the laser output unit is reflected by the polygonal mirror 712, passes through the lens 713 and the mirror 714 and linearly scans (raster scan) the surface of the photoconductor drum 715 to form a latent image representing a document image.

Numeral 717 denotes a primary charger, numeral 718 denotes a flat exposure lamp, numeral 723 denotes a cleaner for collecting non-transferred residual toner, and numeral 724 denotes a pre-transfer charger. Those elements are arranged around the photoconductive drum 715.

Numeral 726 denotes a development unit which develops the latent image formed on the surface of the photoconductor drum 715 by the laser exposure, numerals 731Y, 731M, 731C and 731Bk denote development sleeves which are in contact with the photoconductor drum 715 to develop the latent image, numerals 730Y, 730M, 730C and 730Bk denote toner hoppers for retaining spare toner, and numeral 732 denotes a screw for transporting developing agent. The sleeves 731Y–731Bk, the toner hoppers 730Y–730Bk and the screw 732 form the development unit 726. Those elements are arranged around a rotation shaft P of the development unit. For example, when a yellow toner image is to be developed, the yellow toner development is carried out at the position shown in FIG. 4, and when a magenta toner image is to be developed, the development unit 726 is rotated around the shaft P to position the development sleeve 731M in the magenta developing unit in contact to the photoconductor drum 715. The cyan and black developments are carried out in the same manner.

Numeral 716 denotes a transfer drum for transferring the toner image formed on the photoconductor drum 715 to a sheet, numeral 719 denotes an actuator plate for detecting the position of the transfer drum 716, numeral 720 denotes a position sensor for detecting the movement of the transfer drum 716 to a home position by the proximation to the actuator plate 719, numeral 725 denotes a transfer drum cleaner, numeral 727 denotes a sheet retain roller, numeral 728 denotes a discharger and numeral 729 denotes a transfer charger. Those elements 719, 720, 725, 727 and 729 are arranged around the transfer roller 716.

On the other hand, numerals 735 and 736 denote sheet cassettes for accommodating sheets (papers), numerals 737 and 738 denote feed rollers for feeding the sheets from the cassettes 735 and 736, and numerals 739, 740 and 741 denote timing rollers for timing the sheet feed and transport. The sheet fed and transported through those elements is guided by a sheet guide 749 and wrapped around the transfer drum 716 while a leading edge is carried by a gripper to be described below, and an image formation process is started.

Numeral 550 denotes a drum driving motor which synchronously drives the photoconductor drum 715 and the transfer drum 716. Numeral 750 denotes a peel-off pawl for separating the sheet from the transfer drum 716 after the end of the image formation process, numeral 742 denotes a conveying belt for conveying the separated sheet, and numeral 743 denotes an image fixing unit for fixing the sheet conveyed by the conveying belt 742. The image fixing unit 743 has a pair of thermal pressure rollers 744 and 745.

The overall flow of the process in the present embodiment is now explained.

Figure 5:
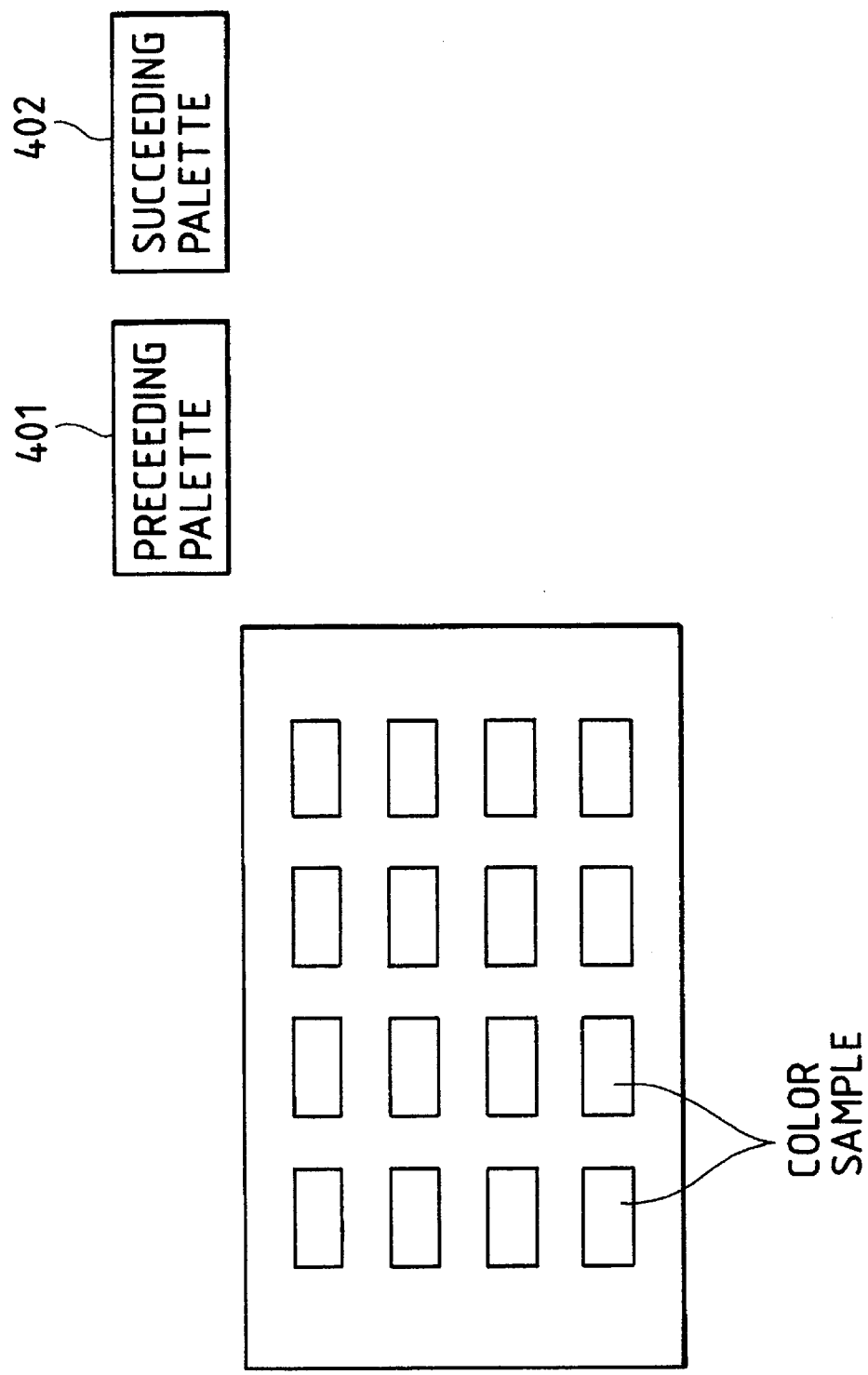
FIG. 5 shows an example of CRT display of a color palette.
Figure 6:
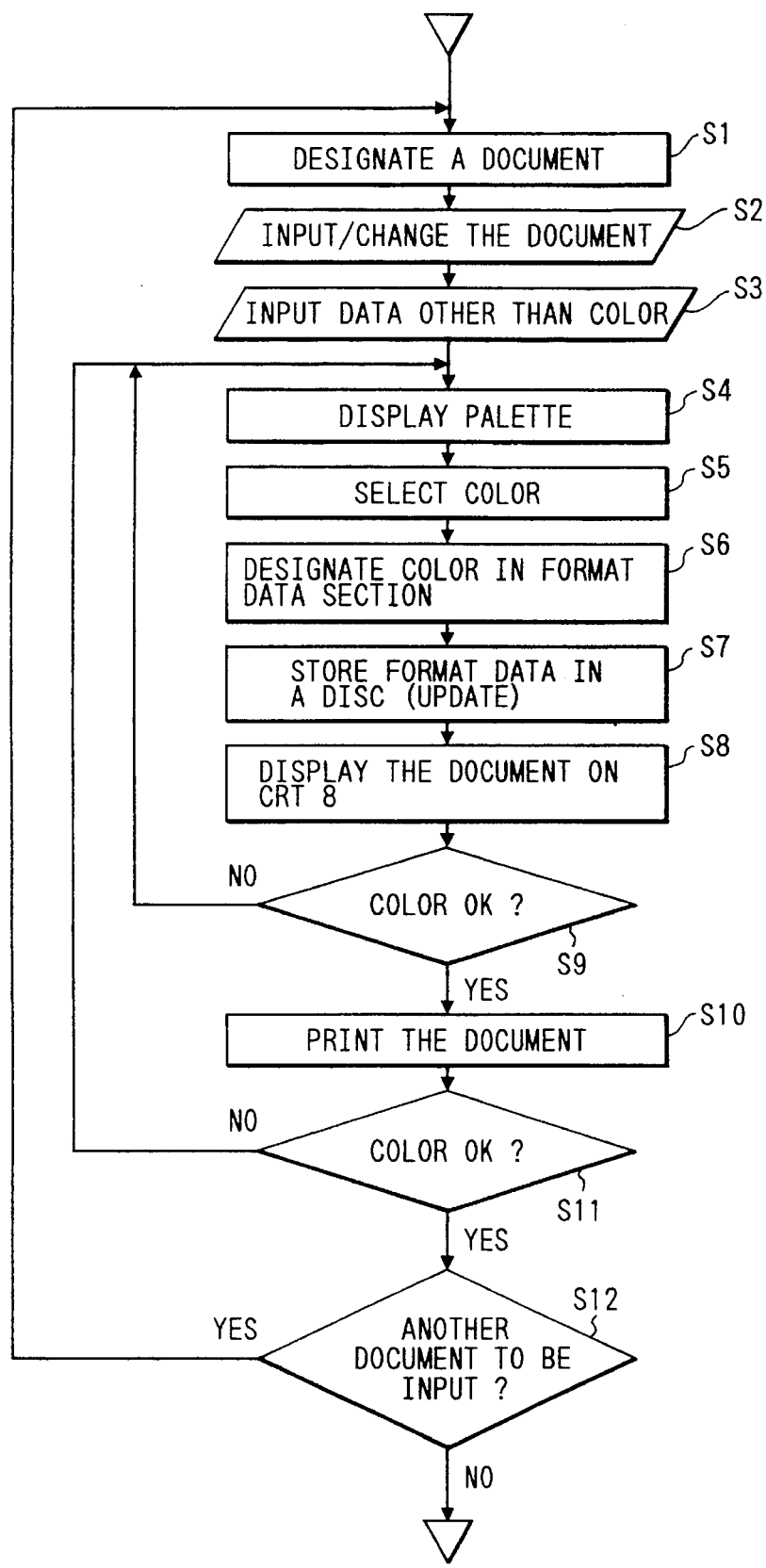
FIG. 6 shows a flow chart of a process of modifying monochromatic character color.
Figure 7A:
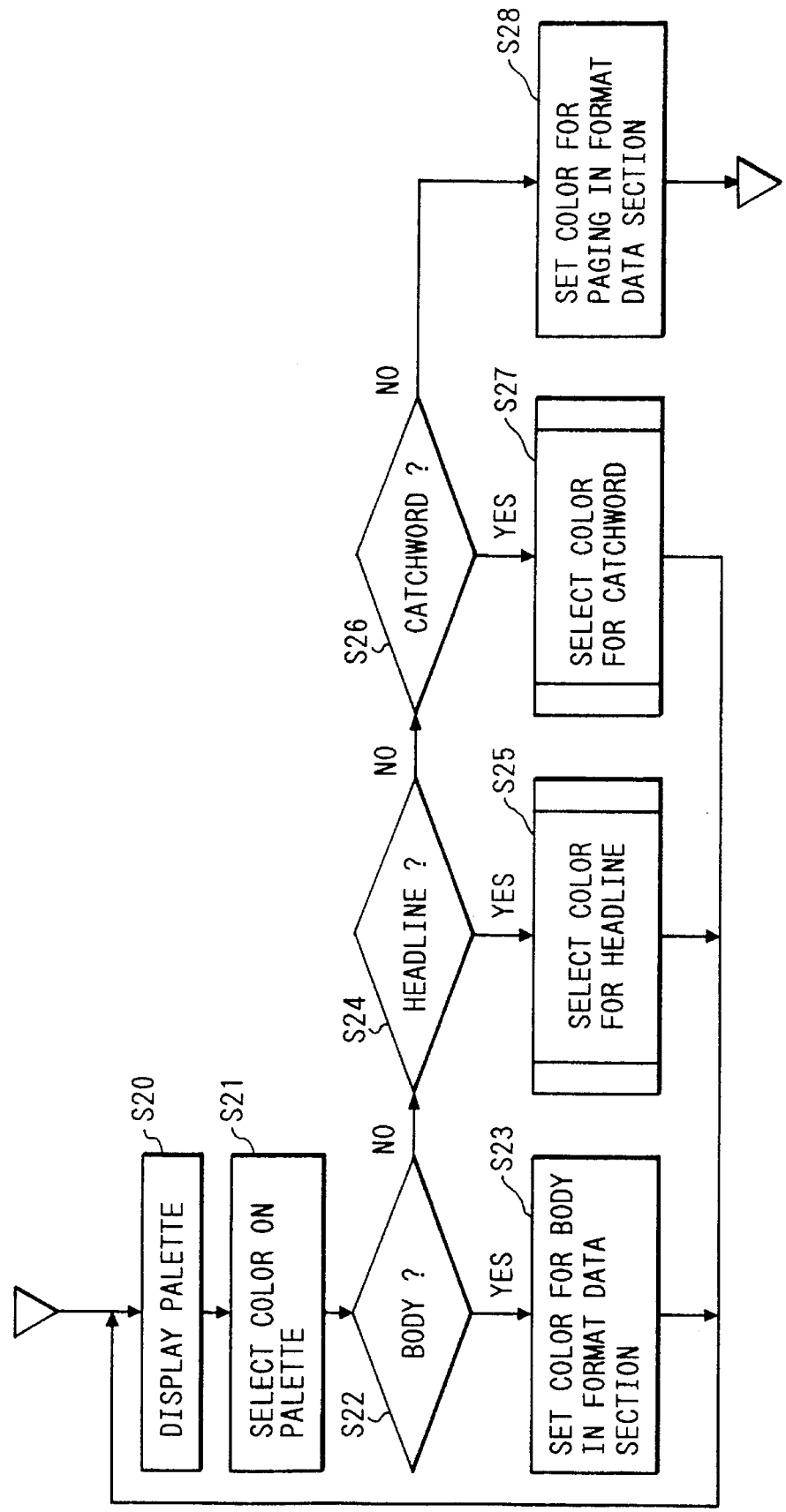
FIG. 7A shows a flow chart of modifying a process of a multi-color character color.
Figure 8B:
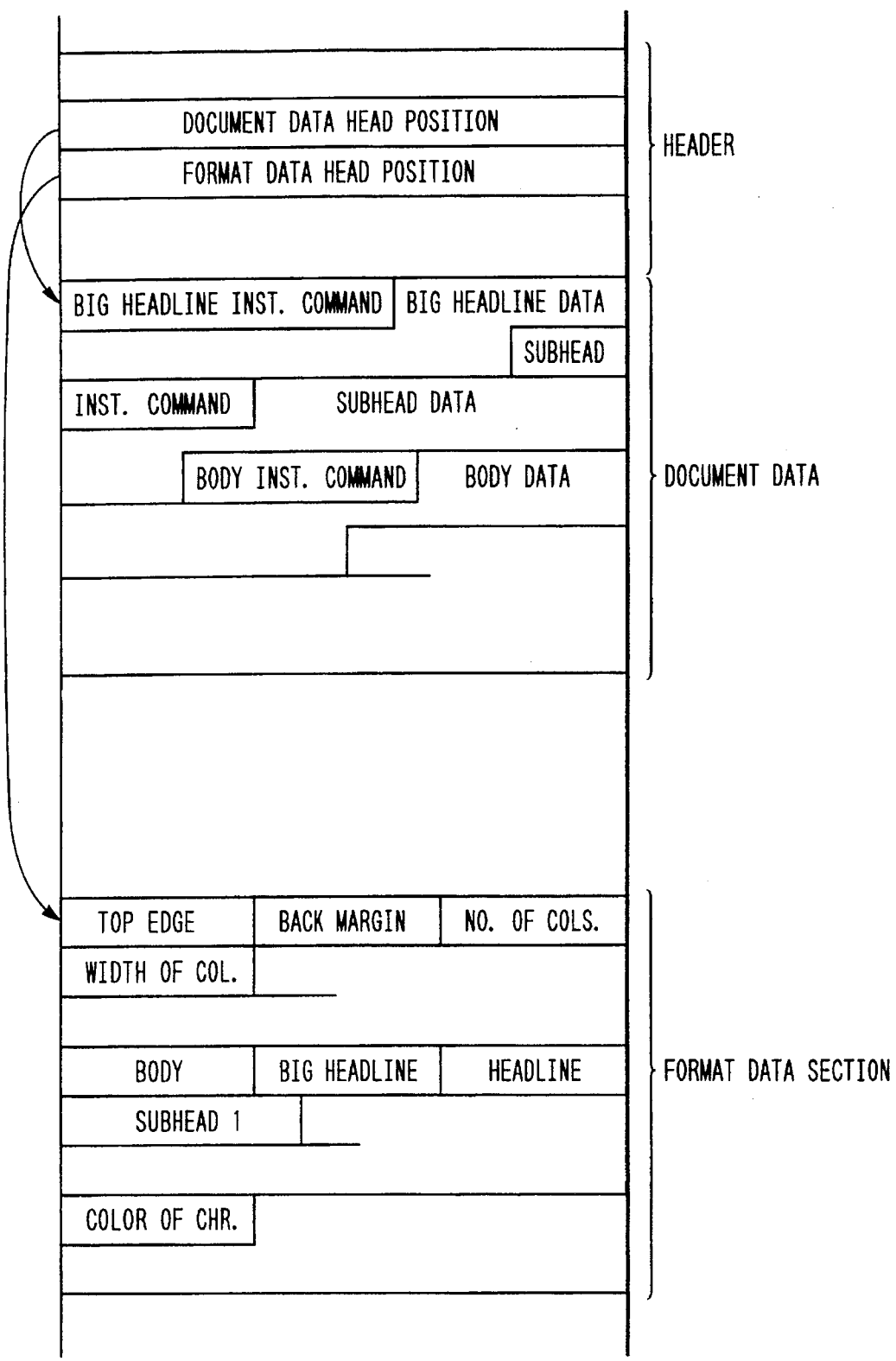
FIG. 8A shows a first example of CRT display of document format information in which character color is monochromatic.
FIG. 8 shows a disk file format of a document in which the character color is monochromatic.
FIG. 8C shows a second example of CRT display of the document format information in which the character color is monochromatic.

FIG. 6 shows a flow chart of a process of the CPU 1. In a document processing apparatus which displays icons of existing documents and a new document sheet on the CRT 8 so that a document is designated, an icon for the subject of work is designated by the pointing device 5 (S1). The designated document is read into the PMEM 2 from the floppy disk 10 or the hard disk 11 so that the document is input or modified (S2). Data other than color is then input to the format information which has been read into the PMEM 2 from the FD 10 or the HD 11 of the designated document (S3). The format information is displayed as shown in FIG. 8A, and the sizes, line spaces, fonts and colors of text, big headline, middle headline, sub-head 1, sub-head 2, sub-head 3, catchword 1, catchword 2, catchword 3 and paginating (these are called format elements; the numbers of small headlines and catchwords may be either singular or plural) may be designated. The non-designated format elements are displayed monochromatically, for example, in black. By clicking a display area of the character color of the format information by means of the pointing device 5, a palette is displayed as shown in FIG. 5 (S4). If there is a desired character color in the palette, the area of that color is clicked by the pointing device 5. If there is no such character color, the palette is paged by clicking the area of a proceeding palette 401 or the area of a succeeding palette 402 to search the desired character color. Since the number of colors displayable on the CRT 8 is limited to 16 in total, the number of colors displayable on the palette screen is 16–n if n colors are displayed in the document other than the palette. The n colors of the palette which are not displayed on the CRT 8 may be sequentially displayed on the CRT 8 by clicking the icon for the succeeding palette by the pointing device 5 so that all colors of the palette can be displayed. When the desired character color is found, the area of that color is clicked by the pointing device 5. The clicked character color information is set in the character color information displayed on the CRT 8 as shown in FIG. 7A, as the palette number 251 and the color number 252. The character color information 8 in the format information as shown in FIG. 8B, in the FD 10 or the HD 11 is updated by the newly set character color information (S7). The document data is developed in the VRAM 9, including the color information, based on the information of the registered format information, and is output to the CRT 8 (S8). This process is explained in detail with reference to FIG. 2. First, the 4-bits/pixel color image data is developed in the VRAM 9 by the CPU 1. The color image data on the VRAM 9 is read by the CRTC 24 in synchronism with the display timing of the CRT 8, is supplied to the CRT 8 through the color palette 21, the DAC 22 and the synchronous signal super-position circuit 23, and displayed on the CRT 8. Since the CRT 8 can retain the image only for an afterimage time of a phosphor of the display screen, the image data of the VRAM 9 is read at a rate of 60 times per second, for example, and it is applied to the CRT 8 and continuously refreshed. The VRAM 9 may be a dual port memory having a random access port and a serial access port and may display 1024 dots×768 lines and display 16 colors at 4 bits/pixel. The image data read from the VRAM 9 is converted to a serial signal in the order of display on the CRT 8 and is applied to the color palette 21. The color palette 21 includes a look-up table so that 16 colors out of 4096 colors represented by four bits for each of the colors R, G and B, are selected to form one palette. By changing the color palette 21 through the CRTC 24, the selection of the 16 colors may be changed. The image signal converted by the color palette 21 is applied to the DAC 22 as the 4-bit digital image signal for each of the colors, R, G and B, and it is converted to an analog signal. The DAC 22 includes three ladder resistor type digital/analog converters which convert the digital image signals of 4 bits for each of the colors R, G and B to analog signals of 16 tones for each of the colors R, G and B. The analog image signal converted by the DAC 22 is applied to the synchronous signal superposition circuit 23. The CRTC 24 generates a 50 KHz horizontal synchronous signal and a 60 Hz vertical synchronous signal as synchronous signals to control the display timing of the CRT 8 and supplies them to the synchronous signal superposition circuit 23. The synchronous signal superposition circuit 23 superimposes the horizontal synchronous signal and the vertical synchronous signal on the green (G) image signal, and applies the result to the CRT 8. The CRT 8 separates the synchronous signals superimposed on the green (G) image signal, and displays the color image represented by the RGB signals in synchronism with the horizontal synchronous signal and the vertical synchronous signal.

Now returning to the flow chart of FIG. 6, the colored document image displayed on the CRT 8 is checked (S9), and if the color is not correct, the content of the format information of the document is displayed on the CRT 8 as shown in FIG. 8A, the character color is clicked by means of the pointing device 5 and the palette is displayed as shown in FIG. 5 to reselect the character color. In FIG. 8A, the portion other than the character color designation area is a portion of the format information necessary for a conventional black-and-white document.

According to the portion of the format information, the vertical dimension line of the print is equal to height of column, and the horizontal dimension is equal to (width of column×number of columns)+intercolumn space×(number of columns−1). The attribute of character can set different sizes and different interline spaces depending on text, big headline, headline, sub-head 1, sub-head 2, sub-head 3, catchword 1, catchword 2, catchword 3 and paging, and as for line typesetting, left margin, right margin, centering or adjustment may be set. The number of lines displayable in the print screen is equal to column height÷(character size in mm+interline space in mm), with any fraction thrown away.

The content of the format information of the document is displayed on the CRT 8 as shown in FIG. 8A, and the color palette for displaying the character color is also displayed as shown in FIG. 5. If there is a desired character color in the palette, the area of that color is clicked by the pointing device 5. Otherwise, the palette is paged by clicking the preceeding palette area 401 or the succeeding palette area 402 until the color proper to the character is found. When it is found, the area of that color is clicked by the pointing device 5. The clicked character color information is set in the character color information of FIG. 8A as palette number 251 and color number 252. The character color information in the format information of FIG. 8B in the FD 10 or the HD 11 and the character color information in the format information on the PMEM 2 are updated by the newly set character color information (S7), and the document with the new character code is displayed again on the CRT 8 (S8). The above step is repeated until the adjustment of the character color is completed.

When the proper character color has been set on the CRT 8 (S9), it is printed out on the color printer 14 (S10). The color printer output is described in detail with reference to FIG. 3. First, the 4 bits/pixel color image data is developed in the IMEM 13 by the CPU 1. The color image data in the IMEM 13 is read by the control circuit 33 in synchronism with the print timing of the color printer 14, applied to the color printer 14 through the color palette 31 and the print I/F 32 and printed out. The IMEM 13 may comprise 4692 dots×6614 lines×4 bits and can develop a 16-color image on a size A4 sheet at a resolution of 400 dpi. The image data read from the IMEM 13 is converted to a serial signal in the sequence of printing by the color printer 14, and the result is applied to the color palette 31. The color palette comprises a look-up table and selects 16 colors out of 4096 colors represented by 4 bits for each of three colors, R, G and B. The selection of 16 colors may be changed by selecting the color palette 31 by the control circuit 33. The image signal converted by the color palette 31 is applied to the printer I/F 32 as a 4-bits/color digital image signal. The printer I/F 32 sends the RGB image signals and the printer control signal from the control circuit 33 to the color printer 14. The color printer 14 may be a color printer which can reproduce 4096 colors. It may be a color laser beam printer (LBP), thermal transfer color printer or ink jet color printer. In actuating, the color printer 14 prints out in combination of three primary colors, yellow (Y), magenta (M) and cyan (C). Accordingly, it converts the color image signal applied as an additive color image signal for RGB to a subtractive color image signal for YMC before it prints out.

The printer output has thus been described.

Then, the character color printed out by the color printer 14 is checked (S11), and if it is not proper, the process returns to the step S4 for correction. After the adjustment of the printer output character color has been completed (S11), the process returns to the step S1 if there is another document to be input (S12). The document data and the format information thereof are stored in the FD 10 or the HD 11 as shown in FIG. 8B. The document data starts with an address which points a head position of the document data in the header for each document. For example, in FIG. 8B, the document data includes, at the first position, a big-headline command which indicates that big headline data follows, and the body of the big-headline data follows thereafter. It then includes a sub-head command which indicates that sub-head data follows, and the body of the sub-head data follows thereafter. It then includes a body command which indicates that text data follows, and that body of data follows thereafter.

The format information starts from an address which points to the head position of the format information in the header for each document. As shown in FIG. 8A, the format information includes top edge information, back margin information, number of columns information, column width information, column height information, intercolumn space information, and character sizes of body, big headline, headline, sub-head 1, sub-head 2, sub-head 3, catchword 1, catchword 2, catchword 3 and paginating, and interline space and line typesetting information. Further, character color information including palette number 251 and color number 252 is stored in the FD 10 or the HD 11 as shown in FIG. 8B.

The content of the format information may be displayed on the CRT 8 by the palette numbers and the color numbers as shown in FIG. 8A or by the colors themselves as shown in FIG. 8C.

[Collective Modification of Character Colors (Multi-Colors) in the Document]

Detail of the collective modification of multi-color character colors in the document is now explained with reference to the accompanying drawings.

FIGS. 1, 2 and 3 show the configuration of the character processing apparatus of the present invention which has been explained earlier.

A process flow in the present embodiment is now explained. FIG. 4 shows a flow chart of an overall process for modifying a monochromatic character color in the document. A difference between the previous embodiment and the present embodiment resides in that the selection of color for the entire document is limited to one color in the previous embodiment while colors may be selected for the respective format elements such as body, headline, catchword and paginating in the present embodiment. A difference, in the process, from the previous embodiment of FIG. 6 resides in the steps S4 to S6. The corresponding steps of the present embodiment are now explained with reference to FIG. 7A.

Figure 7B:
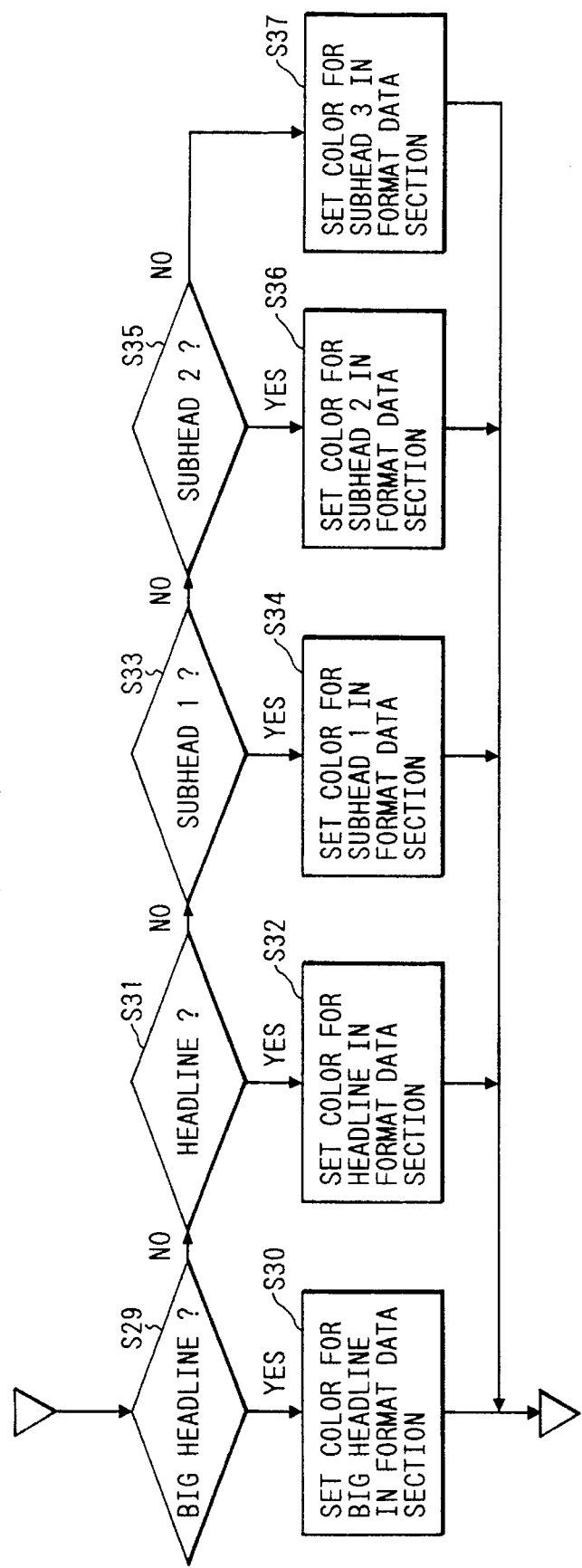
FIG. 7B shows a flow chart of a modification of a multi-color character color.
Figure 7C:
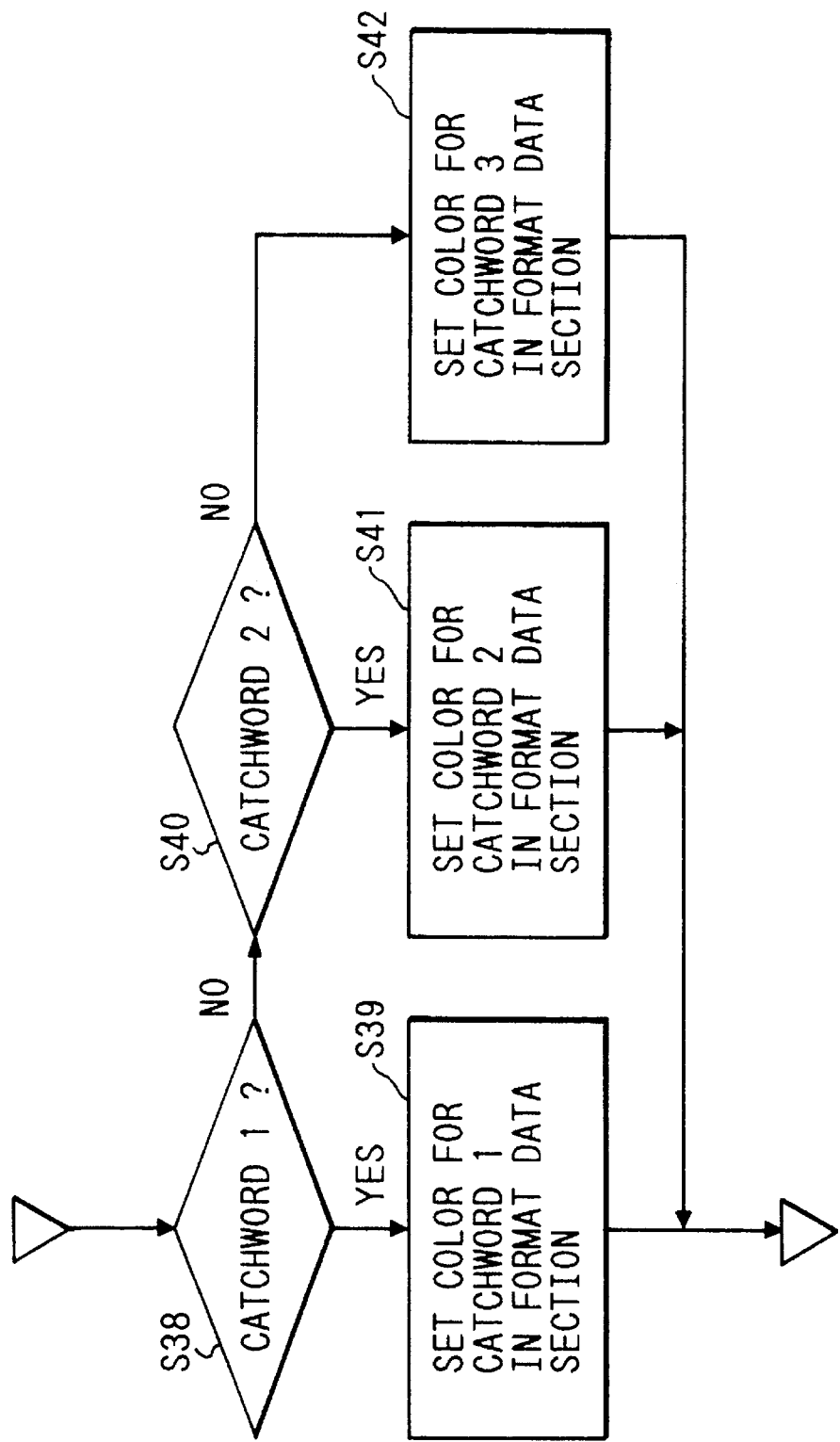
FIG. 7C shows a flow chart of a process of modifying a multi-color character color.

As described above, after the information other than the color has been input to the format information stored in the PMEM 2 (S3), the display area of the character color in the format information displayed as shown in FIG. 9 is clicked by the pointing device 5 and the palette is displayed as shown in FIG. 5 (S20). A desired color on the palette is clicked by the pointing device 5 to select the character color (S21). Whether the selected color is to be designated for the body or not is checked (S22), and if so, the character color of the body of the format information is set (S23). After the character color of the body has been set (S23), the palette is again displayed (S21). Whether the selected color is to be designated for the body or not is checked (S22), and if it is not the body, whether it is for the headline or not is checked (S24). If it is the headline, a headline color selection step (S25) is carried out to select by headline, headline or sub-head. A detailed flow of the headline color selection step (S25) is shown in FIG. 7B. If it is big headline (S29), the character color of the big headline of the format information is set (S30). After the setting, the palette is displayed again (S20), a color is selected (S21), and the above steps are repeated until the colors of the body, headline, catchword and paginating have been designated. A detailed flow of the catchword color selection step (S27) is shown in FIG. 7C.

Figure 10:
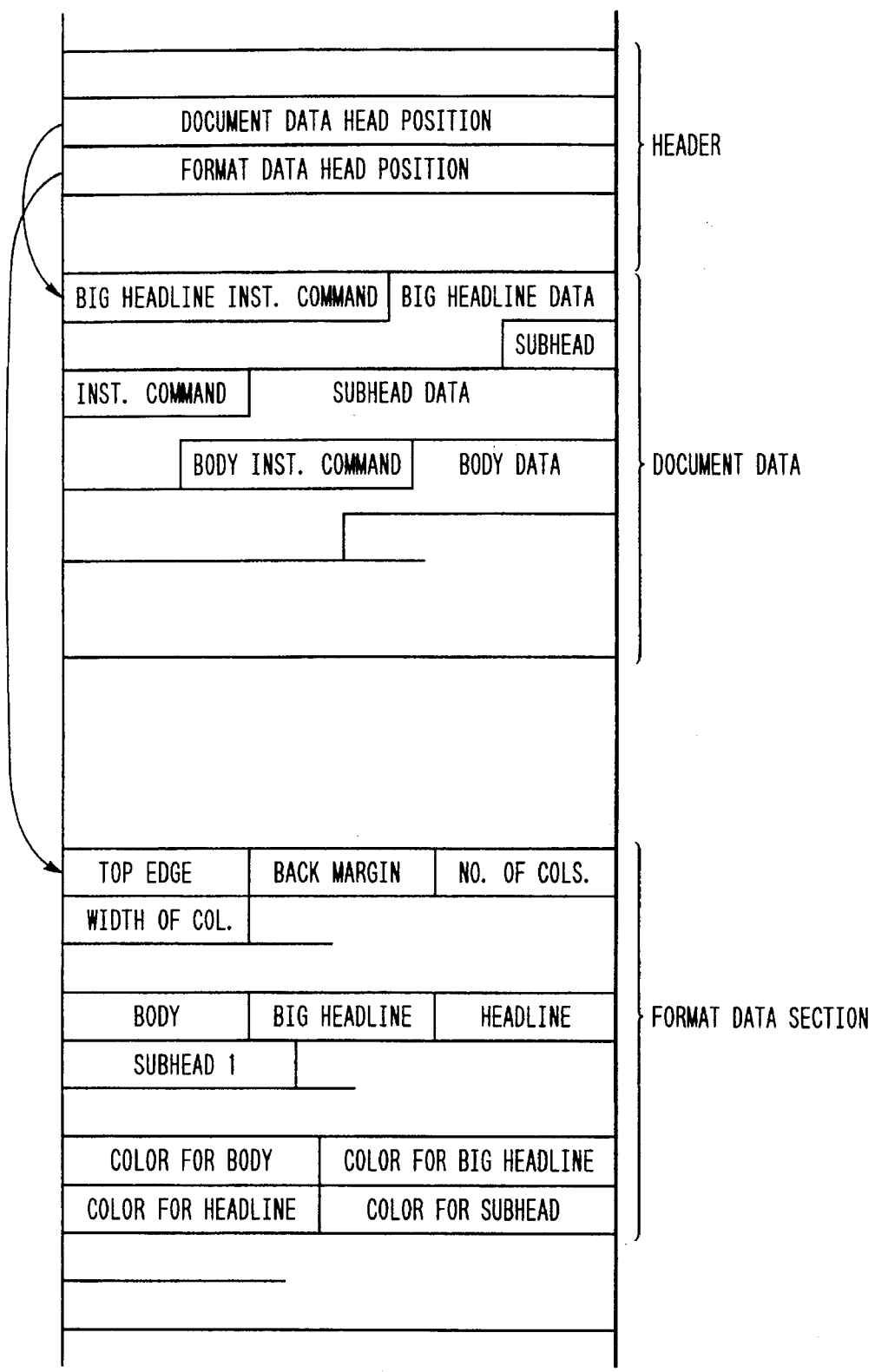
FIG. 10 shows a disk file format of a document in which the character color is multi-color.

The content of the character colors of the format information may be displayed on the CRT 8 by the palette numbers and the color numbers as shown in FIG. 9 or by the colors themselves as shown in FIG. 11. The document data and the format information thereof are stored in the FD 10 or the HD 11 as shown in FIG. 10 in a manner generally identical to that for the previous embodiment. A difference from the previous embodiment resides in that detailed character color information including body character color information, big headline character color information, headline character color information, sub-head 1 character color information, sub-head 2 character color information, sub-head 3 character color information, catchword 1 character color information, catchword 2 character color information, catchword 3 character color information and paginating character color information are stored as shown in FIG. 10 which corresponds to the character color information of FIG. 9.

[Color Display of Document Output Layout]

Color display of a document output layout is now explained in detail with reference to the accompanying drawings.

Figure 12B:
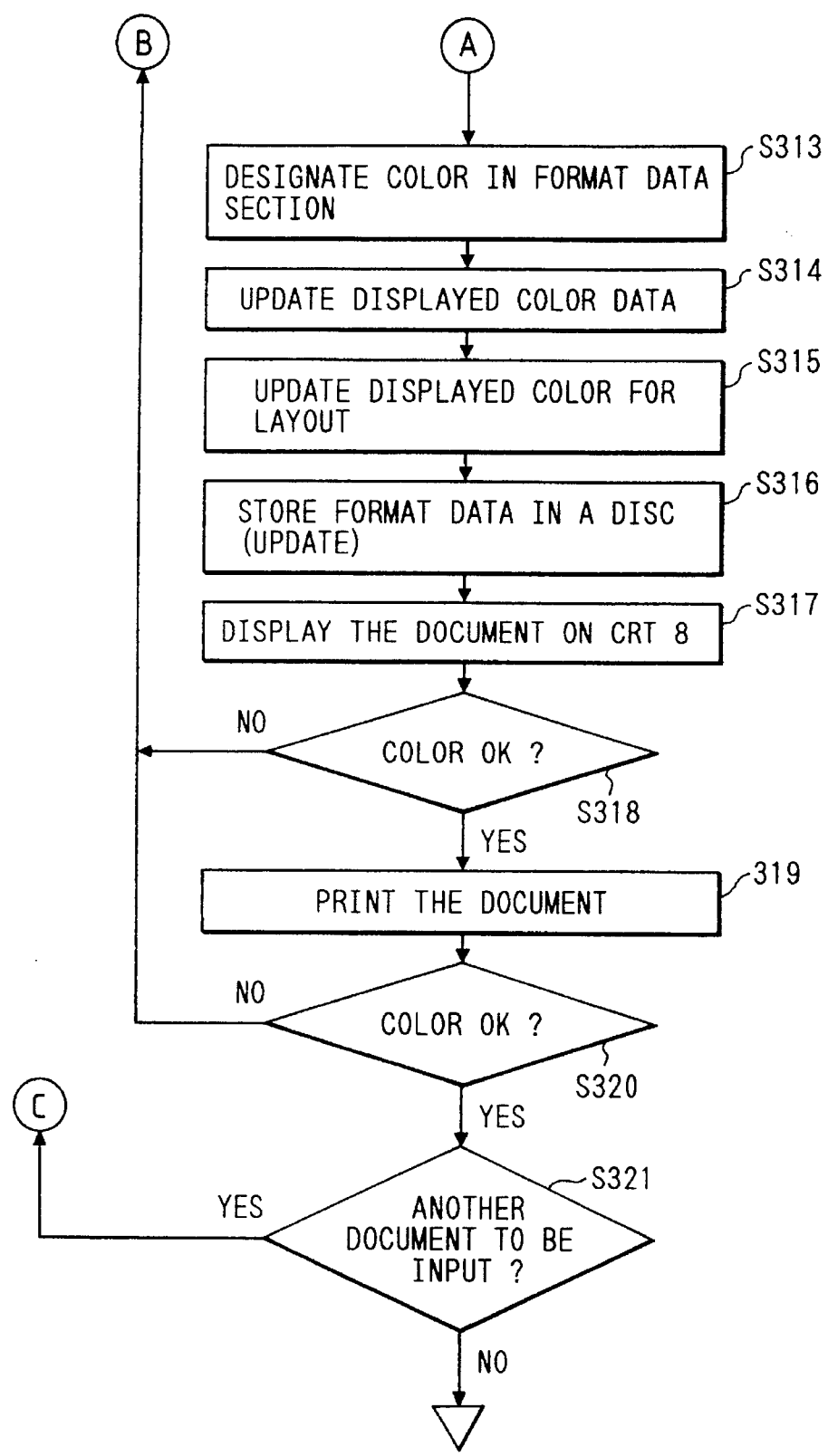
Figure 13:
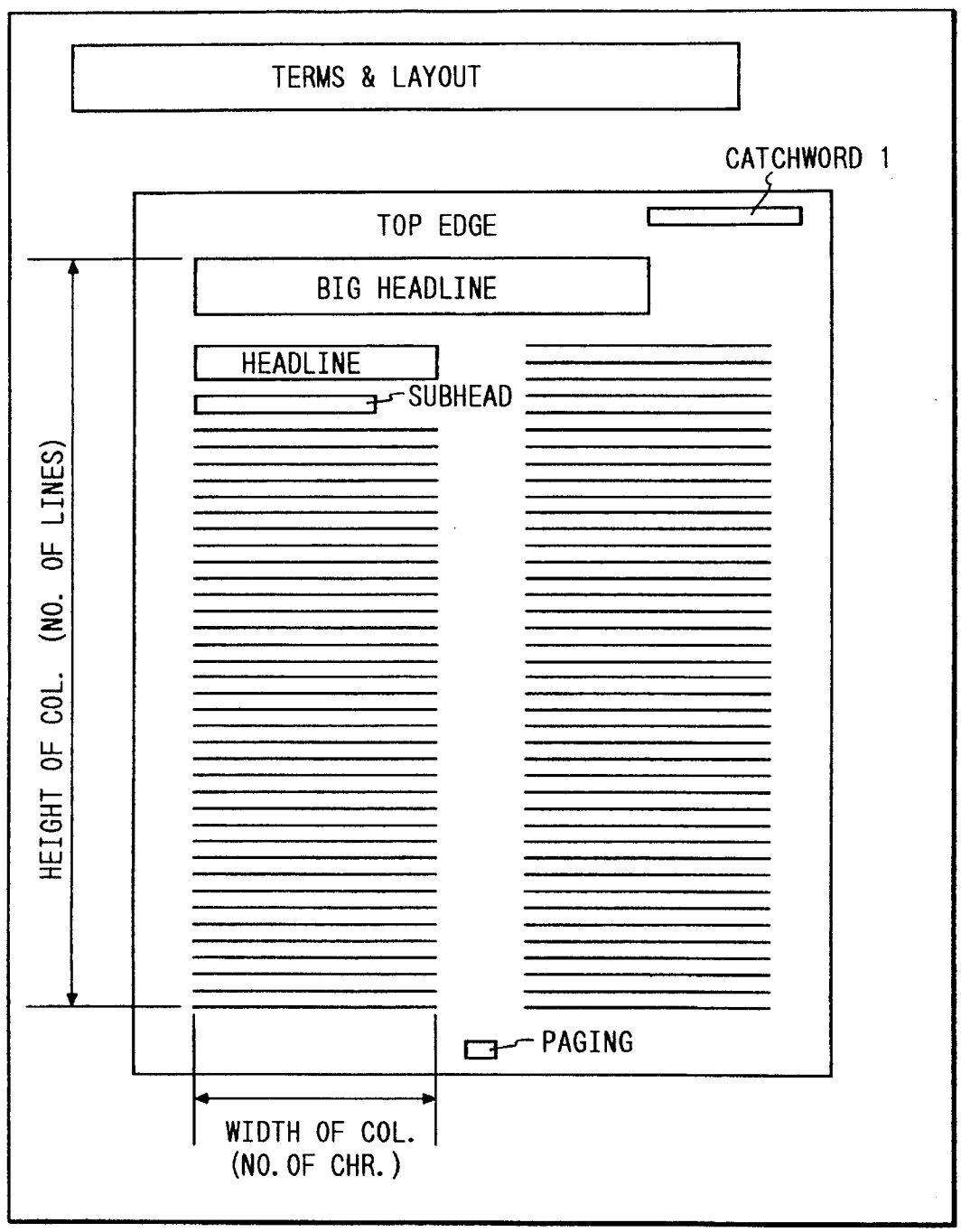
FIG. 13 shows terms and a layout of the document format information.

FIG. 12, consisting of FIGS. 12A and 12B, shows a flow chart of a process of the CPU 1. In a document processing apparatus which displays icons for an existing document and a new document form on the CRT 8 to designate the document, an icon for the work subject is clicked by the pointing device 5 to designate the document (S301). The designated document is read from the FD 10 or the HD 11 into the PMEM 2 and the designated document is displayed on the CRT 8 (S302) for entering and updating the document (S303). Then, entry is made to the format information read from the FD 10 or the HD 11 of the designated document into the PMEM 2 (S304). The format information is displayed as shown in FIG. 9 (S305), and a relational chart which shows an output layout of the format information as shown in FIG. 13 is also displayed (S306) for guidance and confirmation of the operation. The format information other than color is entered by the keyboard 4 and the pointing device 5 (S307). The format information has been described above. When the format information is entered, the display of the format information on the CRT 8 is updated (S308), and the display of the output layout of the format information is also updated (S309). Where no color has been designated in the format information, the format elements having no color designation are displayed monochromatically, for example, in black. When the display area of the character color of the format information is clicked by the pointing device 5, the palette is displayed as shown in FIG. 5 (S311), and when the color is selected by the pointing device 5, the color number is displayed at the display area of the format information (S312) and the color area of the format information is designated (S313). The color area of the format information displayed on the CRT 8 is updated by the content of the designated color information (S314), and the color of the output layout of the format information displayed on the CRT 8 is also updated (S315). The content of the format information is registered in the FD 10 or the HD 11 (S316). Based on the registered format information, the document data including the color information is developed into the VRAM 9 and it is supplied to the CRT 8 (S317). The colored document image displayed on the CRT 8 is checked (S318), and if the color is not correct, the content of the format information of the document is displayed as shown in FIGS. 9 and 13, the character color is clicked by the pointing device 5 and the palette is displayed as shown in FIG. 5 to reselect the character color. In FIG. 9, the portion other than the character color designation area is a portion of the format information which is also necessary to a conventional black-and-white document.

The content of the format information as shown in FIG. 9 is stored in the FD 10 or the HD 11 in the form shown in FIG. 10.

Embodiment 2

[Storing the Format Information as a Library]

An embodiment for storing the format information as a library is now explained in detail.

An overall flow of the process of the present embodiment is first explained.

Figure 14:
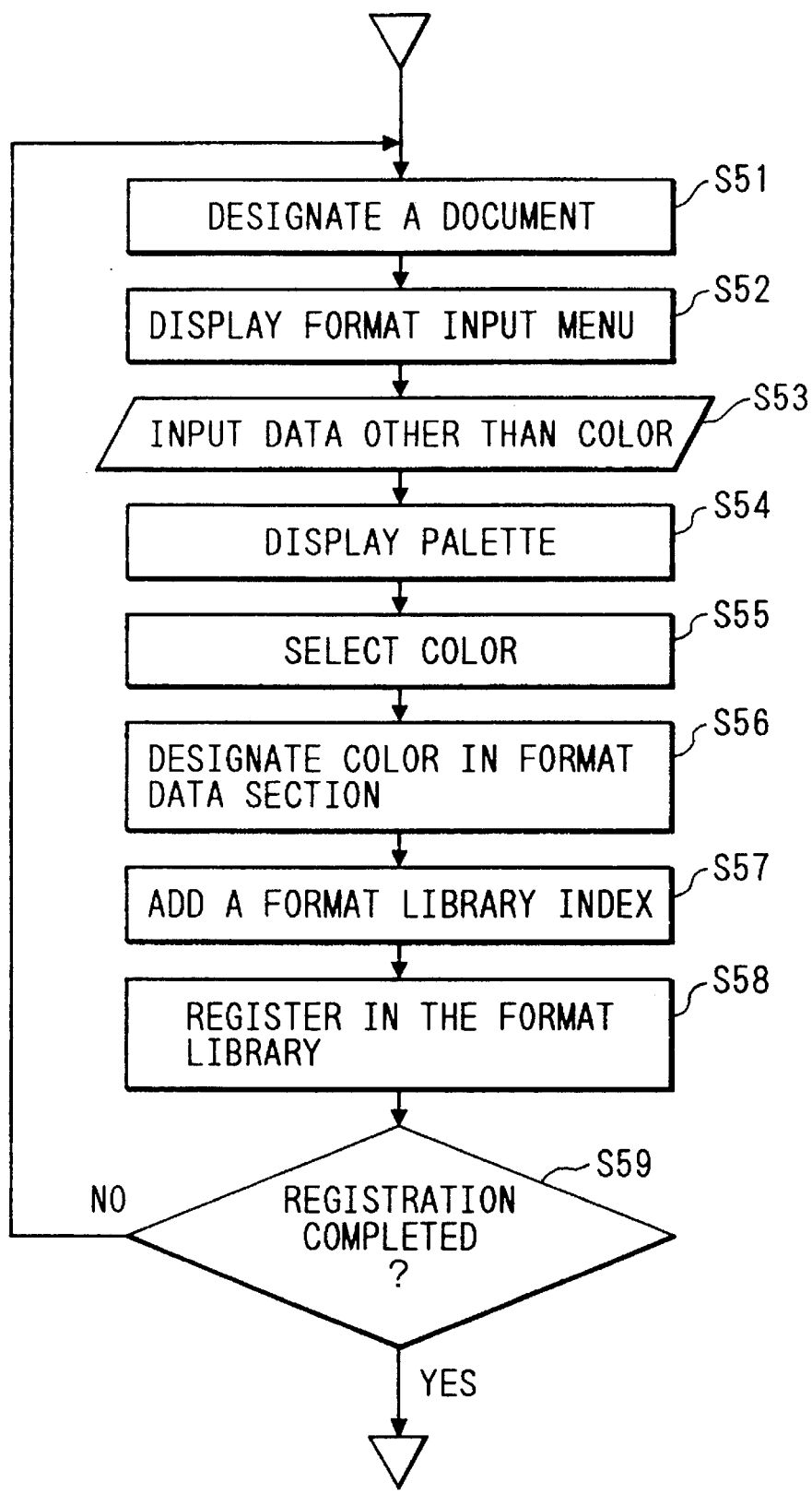
FIG. 14 shows a flow chart of a format library registration process.

FIG. 14 shows a flow chart of the overall process of the CPU 1 when the format library is registered. An existing document or new document form icon displayed on the CRT 8 is clicked by the pointing device 5 (S51). The content of the format information as shown in FIG. 16 is displayed (S52). After the information other than the color has been entered into the format information (S53), the character color on the CRT 8 is clicked by the pointing device 5, and the palette as shown in FIG. 5 is displayed (S54), and a desired color is designated (S55) to set the character color of the format information (S56). After the format information has been set, a format library index name is added (S57) to allow registration of the content of the format information in the format library, and the content of the format information is registered in the format library (S58). Whether the registration has been completed or not is checked (S59), and if it has not, the process returns to the step S52 and repeats the above steps until the registration is completed.

[Access to the Format Library]

Figure 15:
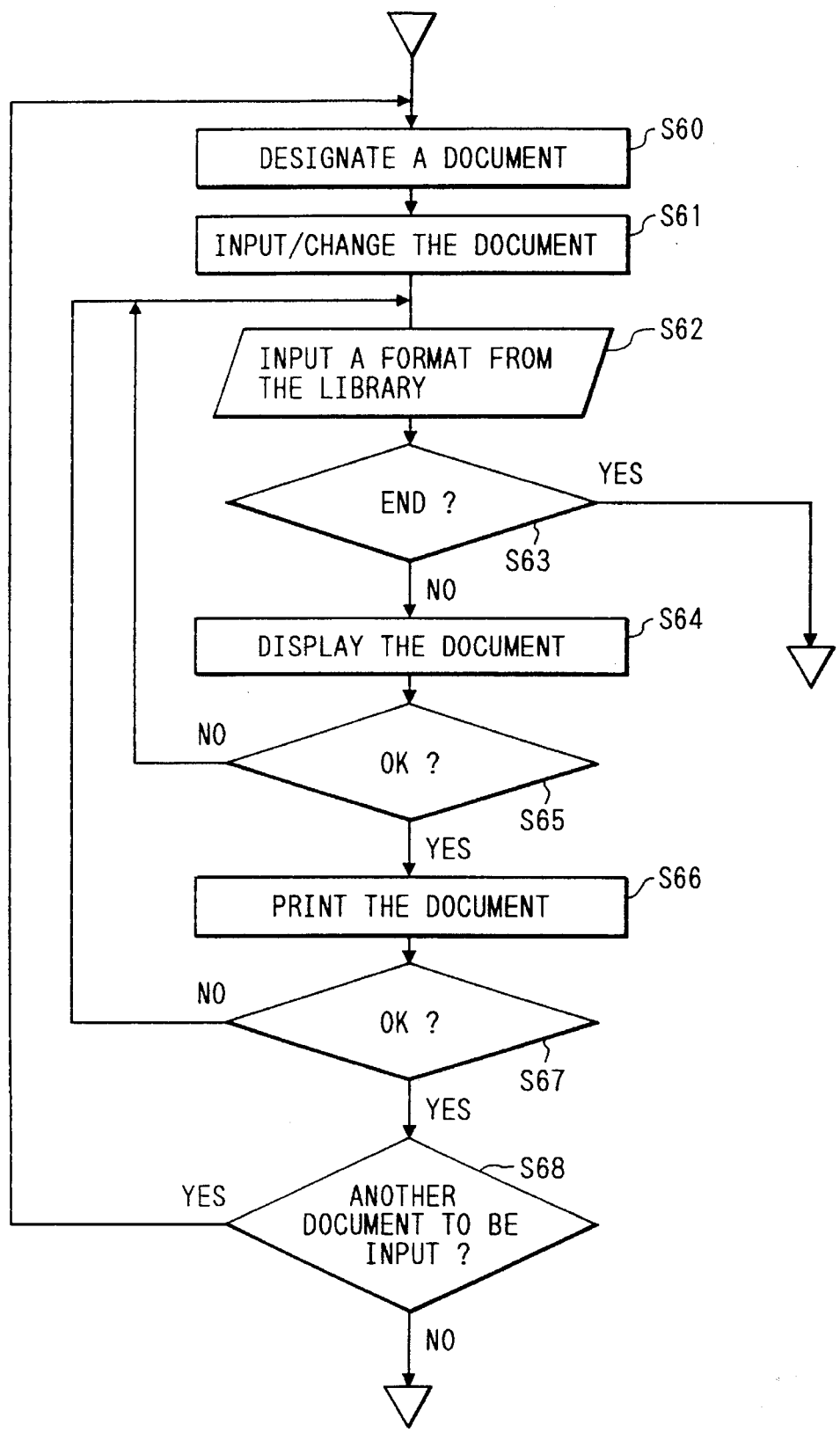
FIG. 15 shows a flow chart of a format library call process.

FIG. 15 shows a flow chart of the overall operation of the CPU 1 when the format library is accessed.

The existing document or new document form icon displayed on the CRT 8 is clicked by the pointing device 5 to designate the document (S60). The designated document is read from the floppy disk 10 or the hard disk 11 into the PMEM 2, the document is designated (S60) and the document is entered or updated (S61). The registered format library is accessed based on the index name (S62), and whether the accessing has been completed or not is checked (S63). If it has not, the document is displayed on the CRT 8 in accordance with the format (S64). If the result is not OK, the process returns to the step S64 and the steps starting from the accessing to the format library are repeated until the OK result is obtained. Alternatively, the format read from the library may be partially modified. It may be registered in accordance with the flow chart of FIG. 14. If the decision is OK, the process proceeds from the step S65 to a step S66 and the document is printed out by the color printer 14 (S66). If the result is OK (S67), whether there is another format library to be accessed or not is checked (S68), and if there is, the process returns to the step S60 and repeats the above steps.

The document data and the format library thereof are stored in the FD 10 or the HD 11 as shown in FIG. 13. The method of storing the document data is same as that explained in the Embodiment 1. A plurality of format information in the format library start at an address which points a head position of the format information in the header for each document. Each of the format information in the format library includes the format information shown in FIG. 16 such as top edge information, black margin information, number of columns information, column width information, column height information, intercolumn space information, and character sizes of body, big headline, headline, sub-head 1, sub-head 2, sub-head 3, catchword 1, catchword 2, catchword 3 and paging, and interline typesetting information. Further, palette numbers 251 and the color numbers 252 are stored in the FD 10 and the HD 11 as the character color information. The content of the format information may be displayed on the CRT 8 by displaying the character colors by the palette numbers and the color numbers as shown in FIG. 12 or by the colors themselves as shown in FIG. 18. While the character colors of the document are collectively and monochromatically changed in the present embodiment, each of the document elements may be individually color-designated and registered in the library.

After the document data thus stored and the first format information in the format library have been written into the PMEM 2, the document data including the color information is developed into the VRAM 9 based on the information of the format information, and is supplied to the CRT 8 (104). This process has been described in the Embodiment 1 by reference to FIG. 2.

[Display and Readout of the Output Layout of the Format Library]

Figure 19:
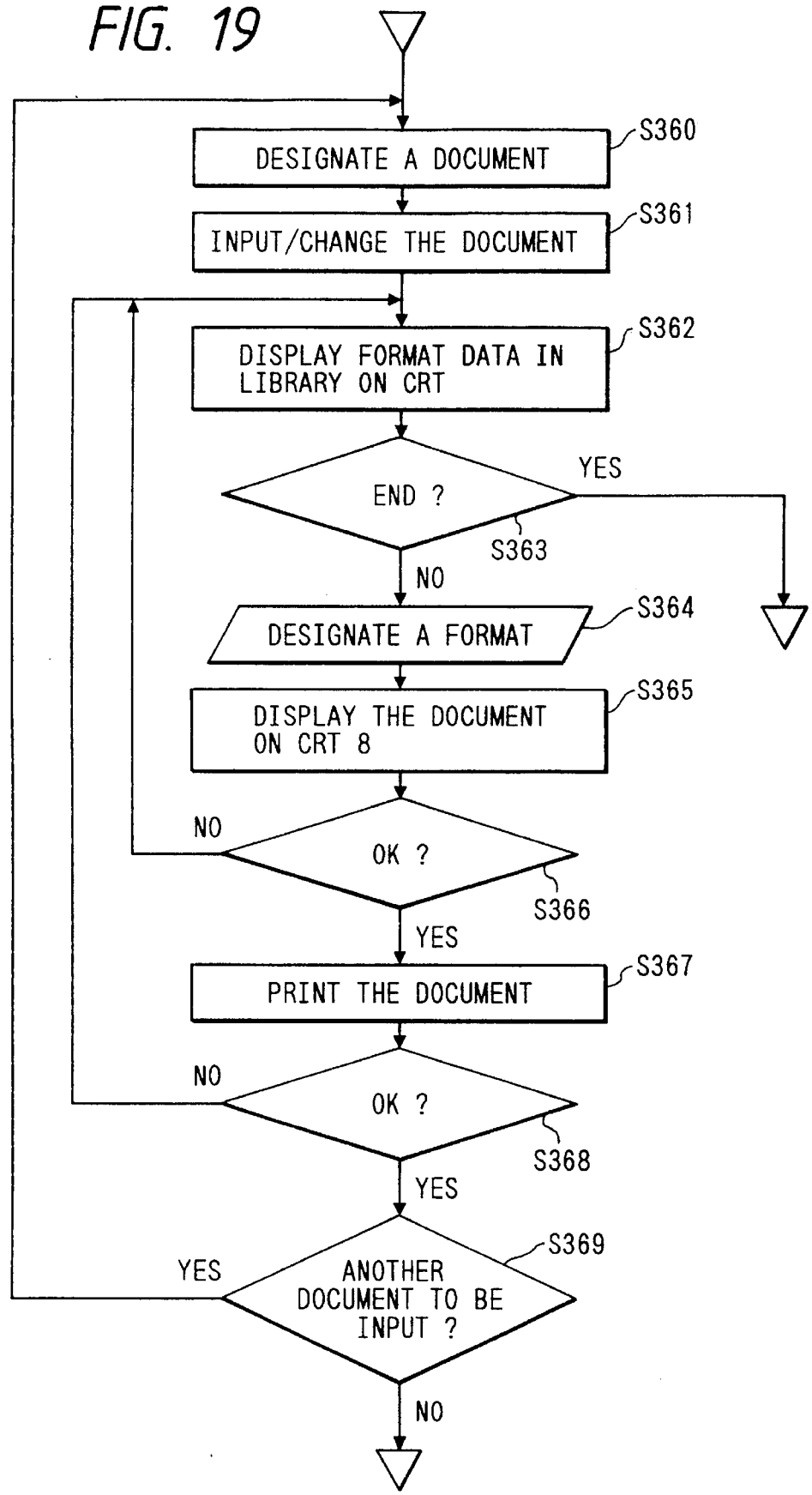
FIG. 19 shows a flow chart of a format library display process.

FIG. 19 shows a flow chart of a process of the CPU 1 when the output layout of the format library is displayed and read.

Figure 20:
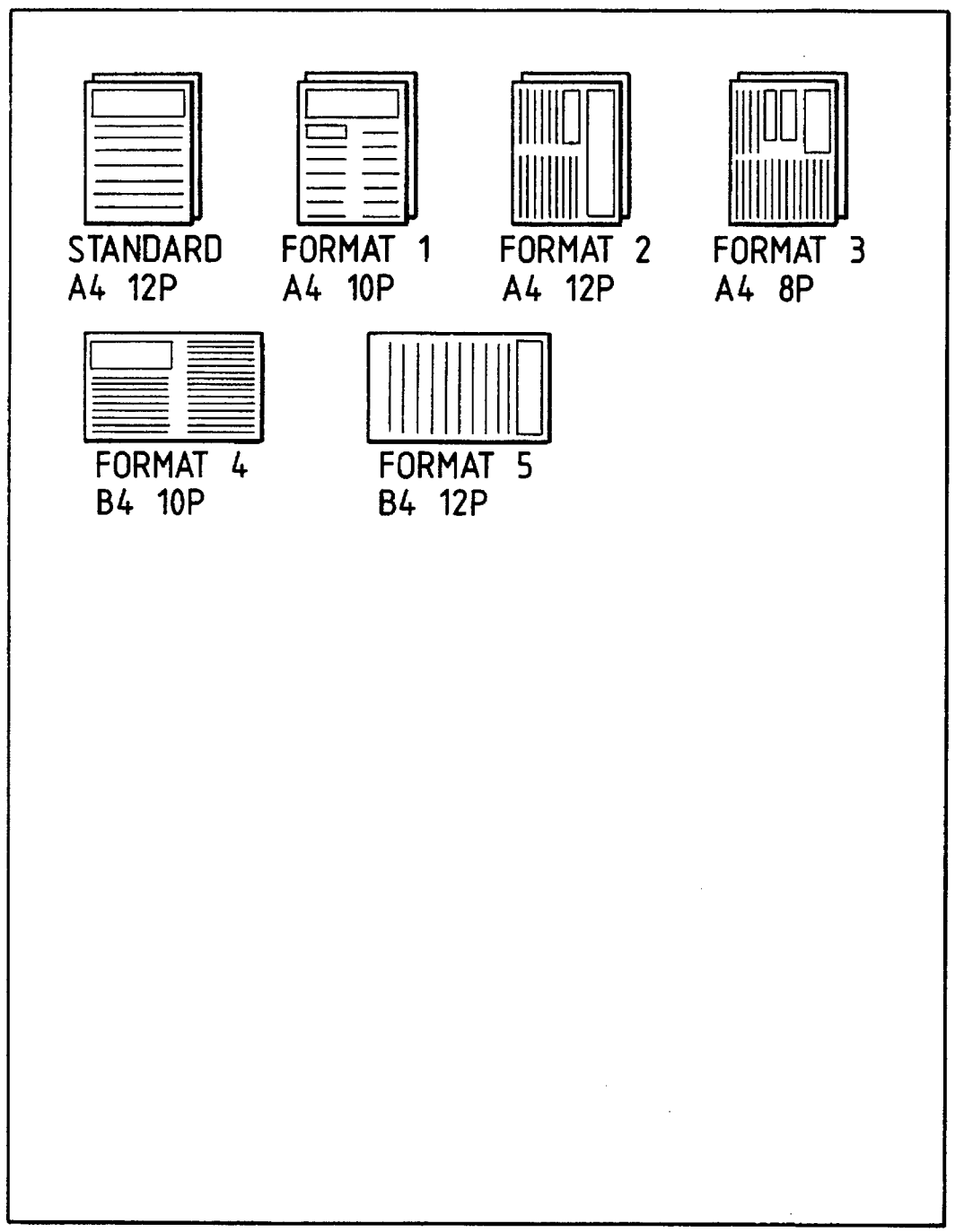
FIG. 20 shows an example of CRT display in an icon form of the format library.

First, existing document/new document form icons are displayed on the CRT 8 to designate a document, and an icon for the work subject is clicked by the pointing device 5 to designate the document (S360). The designated document is read from the floppy disk 10 or the hard disk 11 into the PMEM 2 and the document is entered or modified (S361). A plurality of formats of the library are collectively displayed in the icon form as shown in FIG. 20 based on the color information and the format information by the instruction of the format library display. The color information for the body and the headline of the format information of FIG. 16 as well as other format elements are displayed. If the termination is not instructed (S363), the format is designated. The icon corresponding to a specific format is clicked by the pointing device 5 to designate the format (S364).

The designated format is registered in the format information of the document designated in the step S360, and the document data including the color information is developed into the VRAM 9 based on the registered format and it is supplied to the CRT 8 (S365).

If the result is not correct (S366), the process returns to the step S362 and the above steps starting from the access to the format library are repeated until an affirmation decision is made. Alternatively, the format read from the library may be partially modified. It may be registered in accordance with the flow chart of FIG. 15A. When the affirmation decision is made (S366), the process proceeds to a step S367 and the format is printed out by the color printer 14 (S367).

If the decision is affirmation (S368), whether there is another format to be accessed or not is checked (S369), and if there is another format to be accessed, the process returns to the step S360 and the above steps are repeated.

Figure 17:
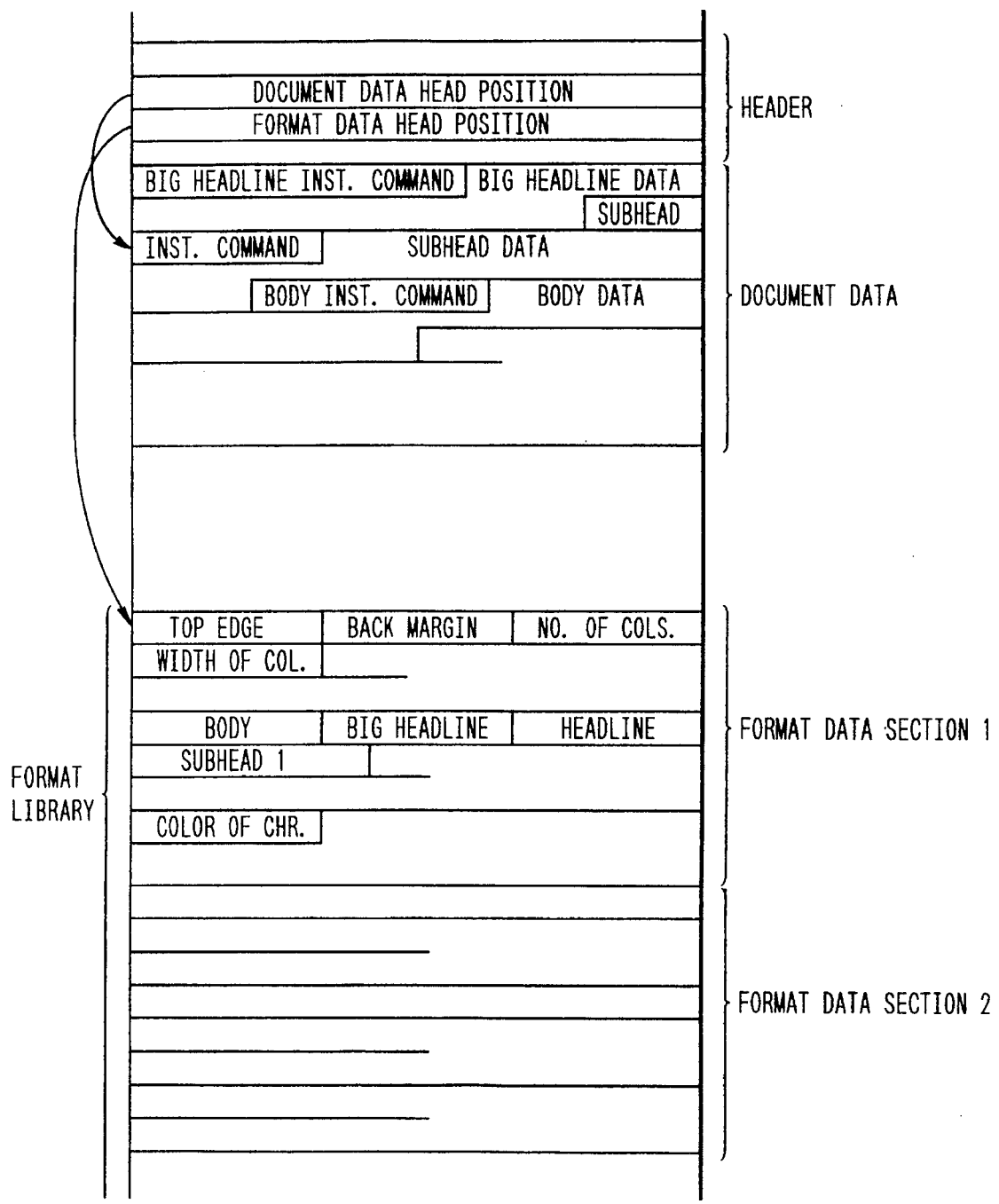
FIG. 17 shows a disk file format of a document when the formats have been registered as the library.

The document data and the format information thereof are stored in the FD 10 or the HD 11 as shown in FIG. 17.

The color information which is a portion of the format information may include background color information to be described in Embodiment 5.

Embodiment 3

[Selection of Character Color at Output]

Figure 21:
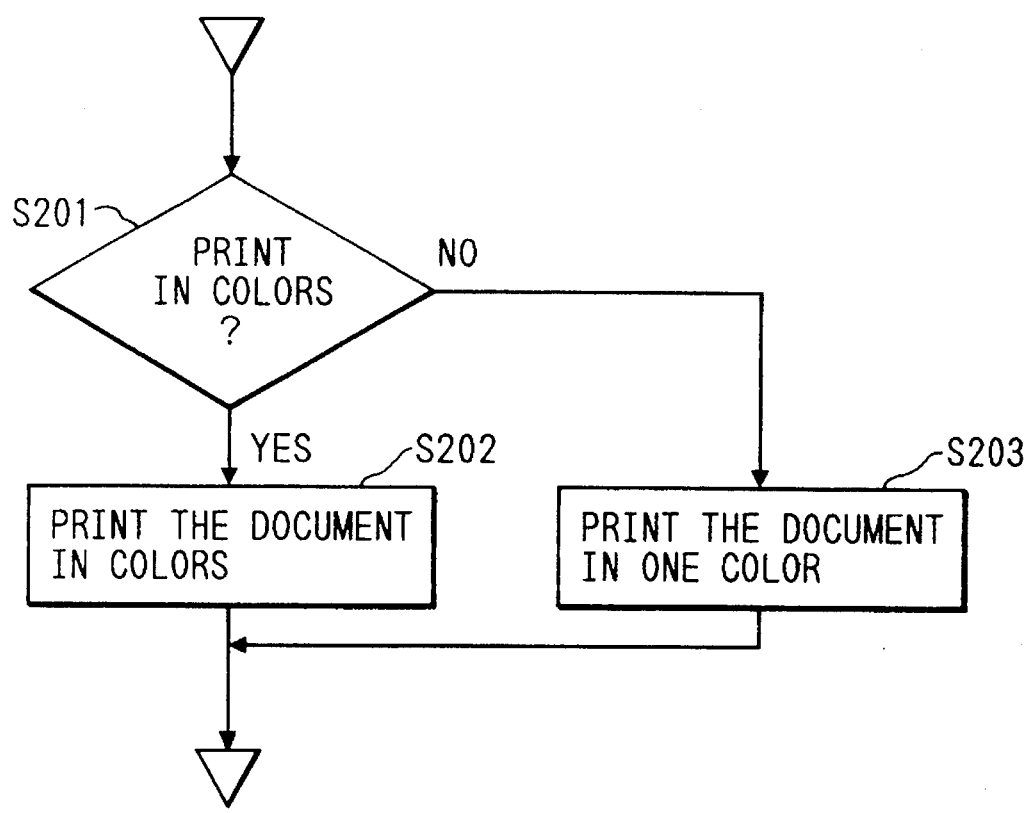
FIG. 21 shows a flow chart of a color designation process in a print mode, FIG. 22A, consisting of FIGS. 12A-1 and 12A-2, shows a flow chart of a character color modification process when a color is designated by a frame in a document.

FIG. 21 shows a portion of flow chart of the process of the present embodiment. The flow of the present embodiment is different from that of the flow chart of FIG. 6 for the Embodiment 1 in only the print step S10. Accordingly, only the print operation of the present embodiment is extracted and shown in FIG. 21. By the step S9, the entry of the document and format and the registration in the FD 10 or the HD 11 have been completed, they are displayed on the CRT 8 in accordance with the format and the color is checked. Whether the printing is to be done in color (one color or multi-color) or monochromatically, for example, in black, is selected (S201). If the printing is to be done in color, the document is printed in accordance with the format (S202), and if the printing is to be done monochromatically, for example, in black, the document is printed monochromatically (S203).

Alternatively, the operator's selection step S201 of the flow chart of FIG. 21 may be omitted and the color information is rendered valid only on the CRT 8 and the printing is done monochromatically, for example, in black.

Embodiment 4

[Selection of the Character Color When the Designation of Character Color in the Document is Duplicate]

Figures 2, 22A:
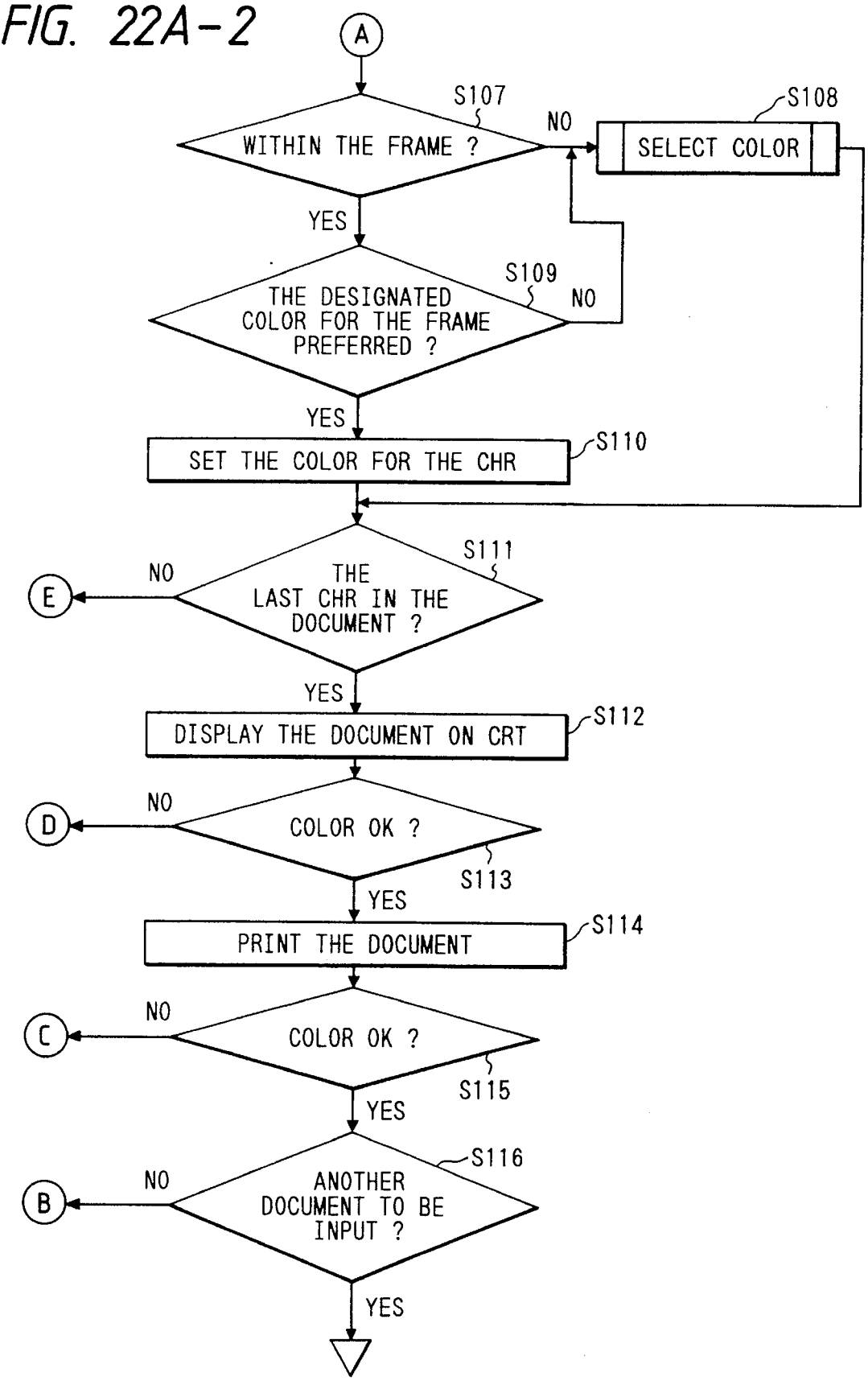
Figures 23A, 23B:
FIG. 23A shows a first example of CRT display of frame attribute format information.
FIG. 23B shows a second example of CRT display of the frame attribute format information.
Figure 24:
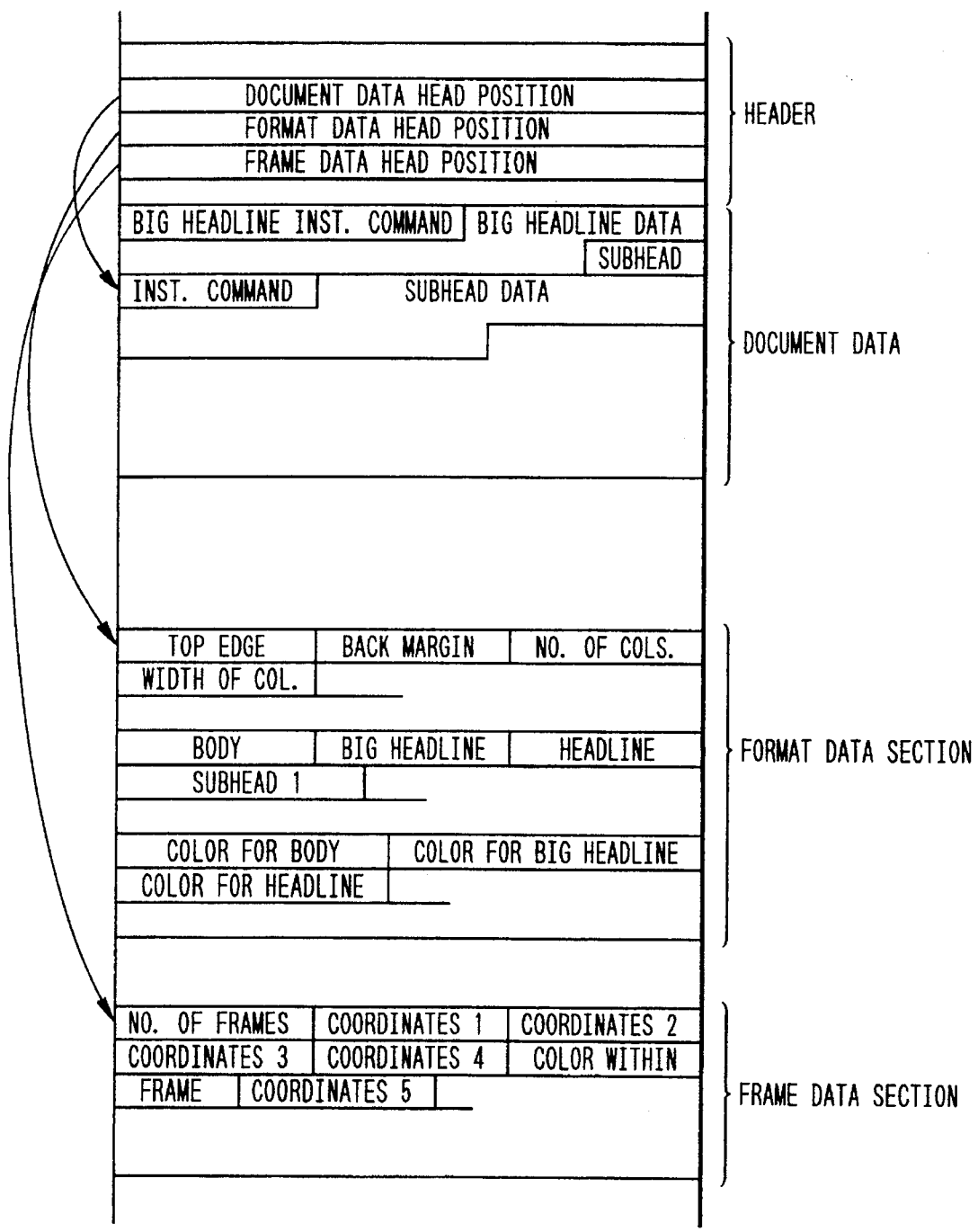
FIG. 24 shows a disk file format of a frame attribute document.

FIG. 22A, consisting of FIGS. 22A-1 and 22A-2, shows a flow chart of an overall process of the present embodiment. Steps S1 to S7 are the same as those of the Embodiment 1. After the document and the format have been registered in the steps up to S7, the character color for a portion of the body of the document is set. When the frame icon on the CRT 8 is clicked by the pointing device 5 (S101), a frame attribute image as shown in FIG. 23A is displayed. On the frame attribute image, the character color may be displayed by the palette numbers and the color numbers as shown in FIG. 23A or by the colors themselves as shown in FIG. 23B. A range in which the character color is to be set is designated by a frame (S102). An area for which no color is designated is displayed monochromatically, for example, in black. The click button of the pointing device 5 is depressed to define a start point of the frame, and the pointing device 5 is moved right while the click button is depressed, and the click button is released when the pointing device 5 reaches an end point. Thus, a frame having an upper left corner defined by the start point and a lower right corner defined by the end point is defined. The start point and the end point are not limited to the upper left and the lower right, respectively. The designated frame information is stored in the FD 10 or the HD 11 as shown in FIG. 24. The document and the format information of FIG. 24 have been described in the Embodiment 1. The frame information starts at an address which points a head position of the frame information in the header for each document. The frame information includes coordinates 1, coordinates 2, coordinates 3, coordinates 4 and designated color in the frame. As shown in FIG. (consisting of FIGS. 25A and 25B) 25, the coordinates indicate the start point coordinates of a range (hatched frame) in which the color is to be designated by the coordinates 1 and the coordinates 2, and the end point coordinates by the coordinates 3 and the coordinates 4.

The palette 5 is then displayed on the CRT 8 as shown in FIG. 5 (S103), and the pointing device 5 is clicked at the color area to be set to select the color (S104). The frame attribute color is designated (S105).

Figure 22B:
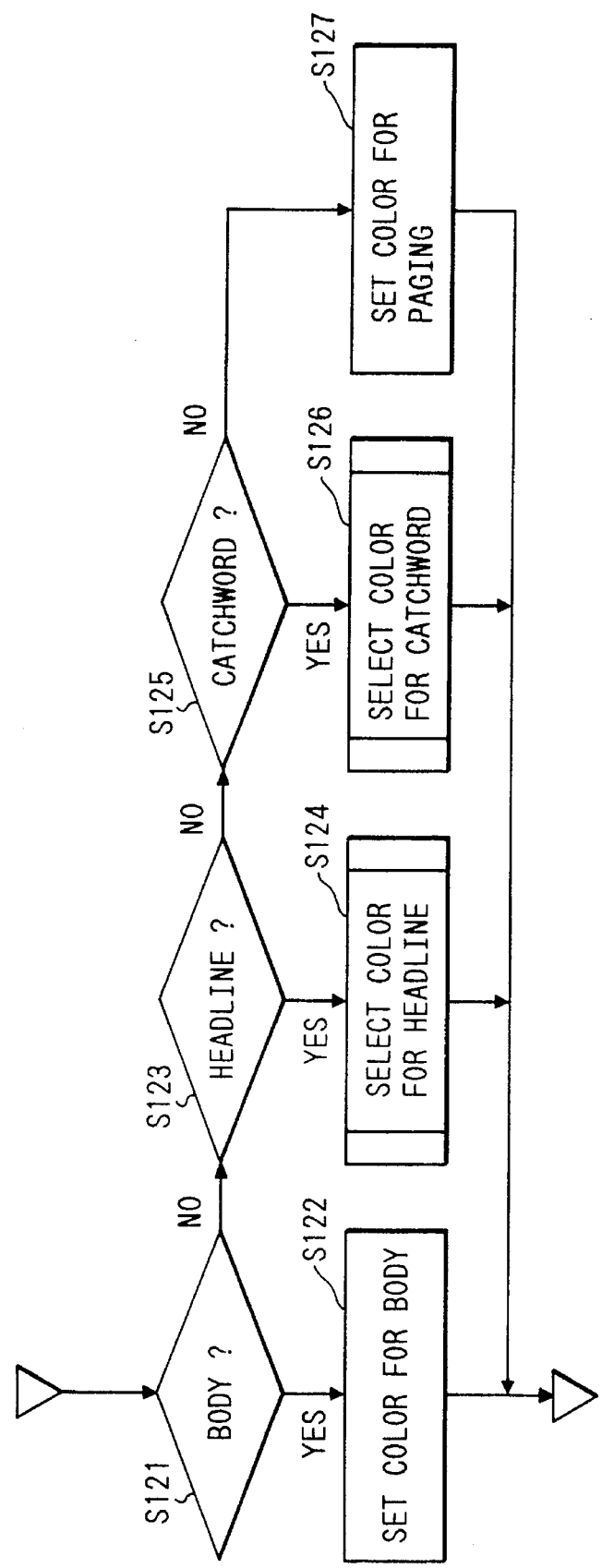
FIG. 22B shows a flow chart of the character color selection process in FIG. 22A.
Figure 22C:
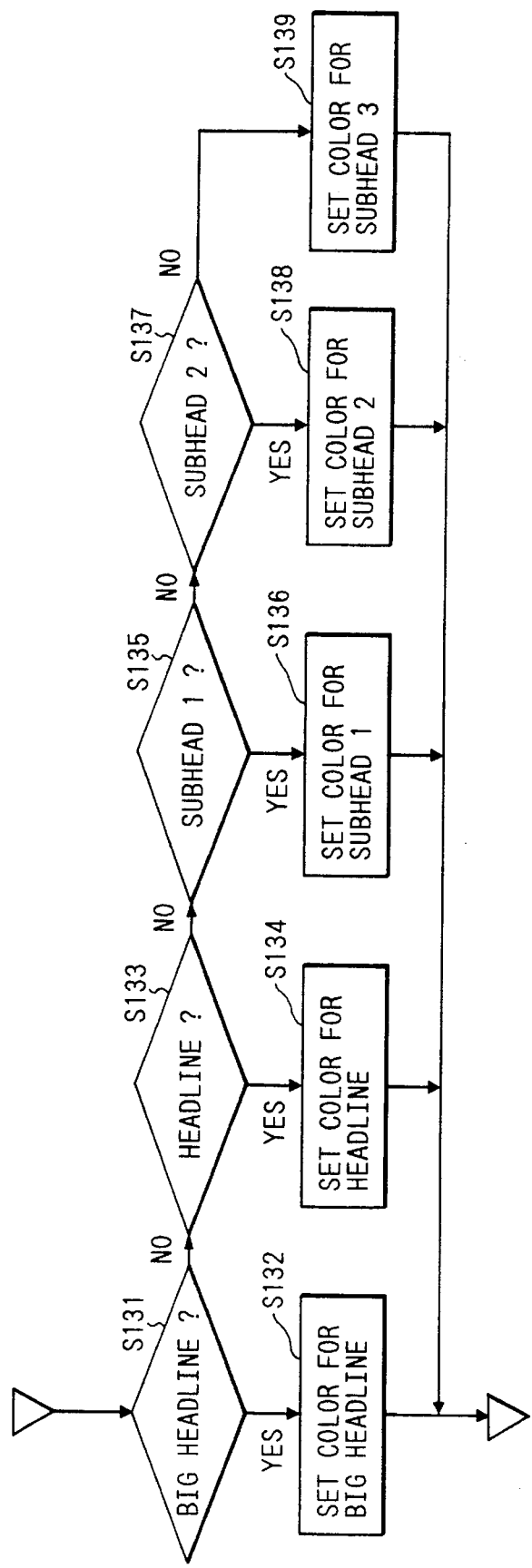
FIG. 22C shows a flow chart of the headline color selection process in FIG. 22B.
Figure 22D:
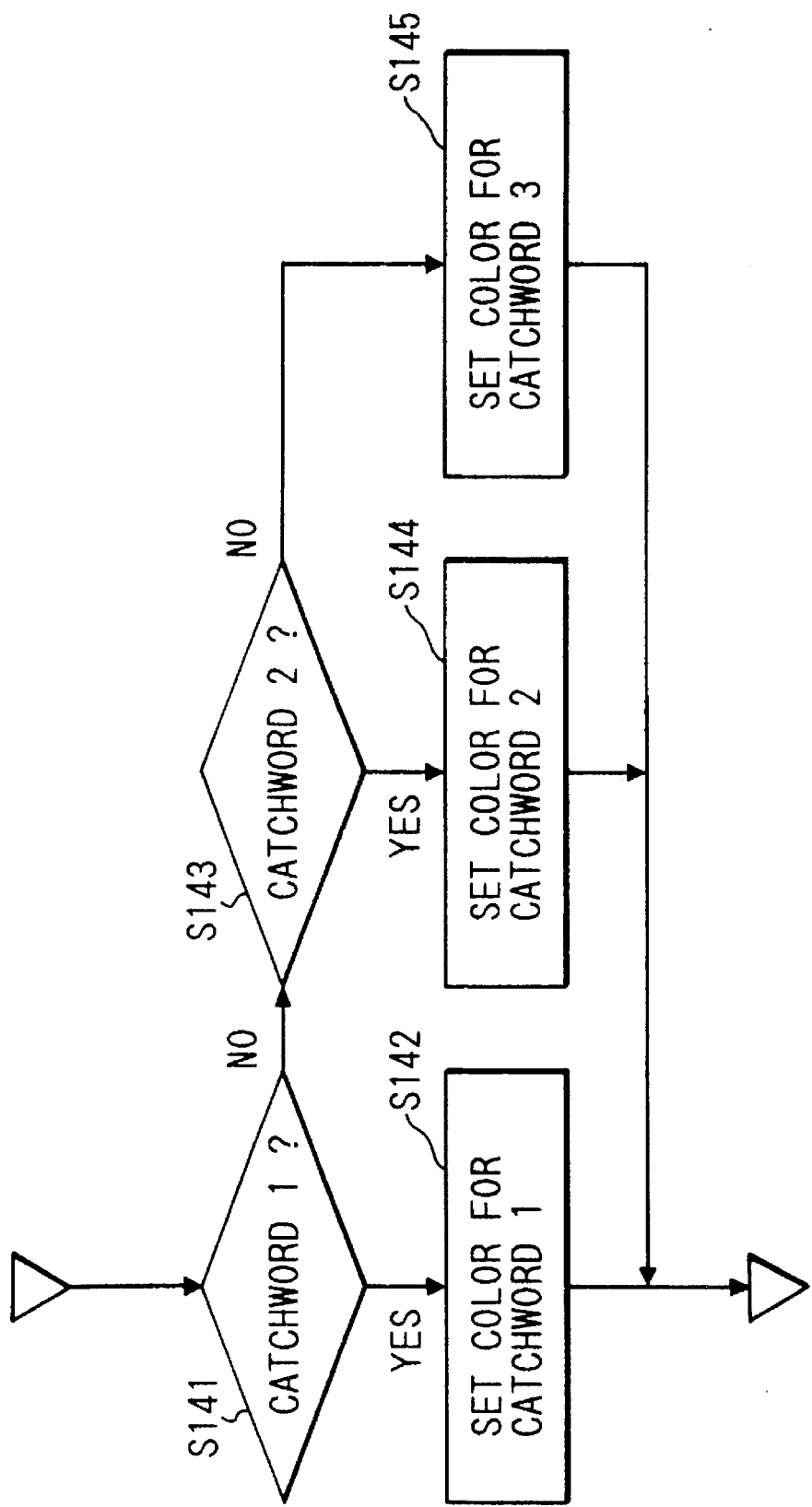
FIG. 22D shows a flow chart of the catchword color selection process in FIG. 22B.

After the frame attribute has been set, whether the range designated by the frame attribute and the range designated by the format element are overlapping or not is checked sequentially for each of the characters in the document (S106). If the character is not within the frame (S107), a character color selection step (S108) is carried out. Whether the character is within the frame or not may be determined by checking whether the start point and end point coordinates of the characters are within the start point and end point coordinates of the frame, respectively, or not, a flow of the character color selection step is shown in FIG. 22B. If the character is for the body in the character color selection step (S121), the body and the character color are set in accordance with the format information (S122), and if the character is not for the body (S121) but for the headline (S123), a headline color selection step (S124) is carried out. If the character is not for the headline (S123) but for the catchword (S125), a catchword color selection step (S126) is carried out. If the character is not for the catchword (S125), a paging character color is set in accordance with the format information. The headline color selection step is shown in FIG. 22C. In the headline color selection step, if the character is for the big headline (S131), a big headline character color is set in accordance with the format information (S132). If the character is not for the big headline (S131) but for the headline (S133), a headline character color is set in accordance with the format information (S134). In this manner, the process is repeated until it reaches a step S139. A catchword color selection step is shown in FIG. 22D. In the catchword color selection step, whether the character is for the catchword 1, catchword 2 or catchword 3 and the color is set as is done in the headline color selection step. After the character colors have been set, the decision-for the next character is made.

Referring back to FIG. 22A, in the step S107, if the character under consideration is within the frame designated by the frame attribute, the character color designated by the frame attribute and the color designated by the format information are duplicate. Accordingly, which designation is to be dominant is determined (S109). If the character color is to be determined in accordance with the format, a character color setting step (S108) is carried out, and if the color designated by the frame attribute is to be dominant, the character color is set in the frame designation color (S110). Referring to FIG. 25, assuming that red is designated for a headline "TO CUSTOMERS" (shown by thick letters) by the format information and green is designated by the frame attribute (shown by a hatched pattern), an example of the setting of the character color in accordance with the character color is shown in FIG. 25A, and that in accordance with the frame attribute is shown in FIG. 25B.

When the character color designated by the frame attribute and the color designated by the format information are duplicate, which one is them is to be dominant is determined in the step S109. Alternatively, the color designated by the frame attribute may be unconditionally selected without the selection by the operator.

After the character color has been set in the steps S108 and S110, whether the entire document has been retrieved or not is checked in a step S111, and if it has not, the process returns to the step S106 and the next character is processed. If it has been completed, the document is displayed on the color CRT in the designated color in accordance with the format (S112), the character color is checked (S113), and if it is proper, the document is printed out in accordance with the format (S114), and the character color is checked (S115). If the character color is not proper in the step S113 or S115, the process returns to the step S4 to reselect the color. If the character color is proper in the step S115, whether there is another document to be entered or not is checked (S116). If there is not, the process is terminated, and if there is, the process returns to the step S1 to enter the document.

In the present embodiment, the color information is individually given for each of the format elements as is done in the Embodiment 2. Alternatively, the color designation may be done collectively instead of individually as is done in the Embodiment 1.

The range in which the character color of the body of the document is set is not limited to the frame but a shape other than the frame may be used.

Embodiment 5

[Designation of Background Color]

FIG. 26 shows a flow chart performed the process of the CPU 1. First, existing 1 new document form icons are displayed on the CRT 8 of the document processing apparatus, and the icon for the work subject is clicked by the pointing device 5 to designate the document (S71). The designated document is read from the floppy disk 10 or the hard disk 11 into the PMEM 2 and the document is entered or modified (S72). The format elements other than the color relating to the form of the format information read from the FD 10 or the HD 11 of the designated document into the PMEM 2 is entered (S73). The format elements relating to the form of the format information are displayed as shown in FIG. 27. The form size, form direction, print format and background color may be designated. When the display area of the background color is clicked by the pointing device 5, the palette is displayed as shown in FIG. 5 (S74), and when the pointing device 5 is clicked at the area of the color to be selected, the color numbers are displayed in the display area of the background color of FIG. 27 (S75) and the background color of the form of the format information is designated (S76).

The information on the character set of the format information is then displayed as shown in FIG. 8A, and the sizes, interline spaces, fonts and colors of the body, big headline, headline, sub-head 1, sub-head 2, sub-head 3, catchword 1, catchword 2, catchword 3 and paging (which are referred to as format elements and in which the numbers of the sub-heads and the catchwords may be either singular or plural) may be designated. The non-designated format elements are displayed monochromatically, for example, in black. When the display area of the character color of the format information is clicked by the pointing device 5, the palette is displayed as shown in FIG. 5 (S78), and when the pointing device is clicked at the area of the color to be selected, the color numbers are displayed in the display area of the character color of the format information (S79) and the color area of the format information is designated (S80). The entire format information is registered in the FD 10 or the HD 11 (S81). The document data including the color information is developed into the VRAM 9 based on the information of the format information thus registered, and it is supplied to the CRT 8.

The colored document image displayed on the CRT 8 is checked (S83), and if the color is not proper, the content of the format information of the document is displayed as shown in FIGS. 27 and 8A, and the background color or character color is clicked by the pointing device 5 and the palette is displayed as shown in FIG. 5 to reselect the character color. In FIG. 27, the portion other than the character color designation area is a portion of the format information which is also necessary for a conventional black-and-white document.

If the character color displayed on the CRT 8 is proper (S83), it is supplied to the color printer 14 (S84).

Whether the character color supplied to the color printer 14 is proper or not is checked (S85), and if it is not proper, the process returns to the step S73 to correct it. When the adjustment of the printer output character color is completed (S85), the process returns to the step S71 if there is another document to be entered. The document data and the format information thereof are stored in the FD 10 or the HD 11 as shown in FIG. 8B. The document data starts at an address which points a head position of the document data in the header for each document. In FIG. 15, the document data first includes a big-headline command which indicates that big-headline data follows, and the body of the big-headline data follows thereafter. It then includes a sub-head command which indicates that sub-head data follows, and the body of the sub-head data follows thereafter. It then includes a body command which indicates that body data follows, and the body data follows thereafter.

The format information starts at an address which points a head position of the format information in the header for each document. In FIG. 15, the format information includes the information on the form size, form direction, print format and background color shown in FIG. 14 and the format information shown in FIG. 15 including top edge information, back margin information, number of columns information, column width information, column height information, intercolumn space information, and size and interline space line typesetting information of body, big headline, headline, sub-head 1, sub-head 2, sub-head 3, catchword 1, catchword 2, catchword 3 and paginating. Further, the palette numbers 251 and the color numbers 252 are stored in the FD 10 or the HD 11 as the character color information.

What is claimed is:

1. A document processing apparatus comprising:

memory means for storing format information including a plurality of format elements relating to document information to be output, and for storing area information including color information;

first setting means for setting a designated color for a designated one of the plurality of format elements stored in said memory means;

second setting means for setting a designated color for a designated one of the plurality of area information stored in said memory means;

priority setting means for setting which one of the format information and the area information stored in said memory means has a higher priority;

decision means for determining which of the format information or the area information stored in said memory means, has higher priority based on the priority set by said priority setting means; and output means for outputting a character pattern in a color set for one of the plurality of format elements corresponding to the character pattern by said first setting means if the format information has the higher priority as determined by said decision means, and for outputting a character pattern in a color set for one of the plurality of area information including the character pattern by said second setting means if the area information has the higher priority as determined by said decision means.

2. A document processing apparatus according to claim 1 wherein the color information includes color information indicating a background color in the document information.

3. A document processing apparatus according to claim 1 wherein the format elements include body, headline, catchword and paginating.

4. An apparatus according to claim 1, wherein said output means comprises a printer engine for printing a document.

5. An apparatus according to claim 1, further comprising display means for displaying patterns of colors which can be designated, wherein the color is designated on said display means.

6. A document processing method comprising the steps of:

reading, from a memory, format information including a plurality of format elements relating to document information to be output, and area information including color information;

first setting a designated color for a designated one of the plurality of format elements read in said reading step;

second setting a designated color for a designated one of the plurality of area information read in said reading step;

setting a priority as to which one of the format information and the area information read from the memory has a higher priority;

determining which of the format information or the area information read in said reading step, has higher priority based on the priority set in said setting a priority step; and outputting a character pattern in a color set for one of the plurality of format elements corresponding to the character pattern in said first setting step if the format information has the higher priority as determined in said determining step, and for outputting a character pattern in a color set for one of the plurality of area information including the character pattern in said second setting step if the area information has the higher priority as determined in said determining step.

7. A document processing method according to claim 6, wherein the color information includes color information of a background color in the document information.

8. A document processing method according to claim 6, wherein the format elements include body, headline, catchword and paginating.

9. A method according to claim 6, wherein said outputting step is performed using a printer engine for printing the document.

10. A method according to claim 6, further comprising the step of displaying, on a display, patterns of colors which an be designated, wherein the color is designated on the display.

11. A document processing apparatus comprising:

first setting means for setting a designated color for a designated one of the plurality of format elements;

second setting means for setting a designated color for a designated one of the plurality of area information;

priority setting means for setting which one of the format information and the area information has a higher priority;

decision means for determining which of the format information or the area information has higher priority based on the priority set by said priority setting means; and output means for outputting a character pattern in a color set for one of the plurality of format elements corresponding to the character pattern by said first setting means if the format information has the higher priority as determined by said decision means, and for outputting a character pattern in a color set for one of the plurality of area information including the character pattern by said second setting means if the area information has the higher priority as determined by said decision means.

12. A document processing apparatus according to claim 11, wherein the color information includes color information indicating a background color in the document information.

13. A document processing apparatus according to claim 11, wherein the format elements include body, headline, catchword and paginating.

14. A document processing apparatus according to claim 11, wherein said output means comprises a printer engine for printing a document.

15. A document processing apparatus according to claim 11, further comprising display means for displaying patterns of colors which can be designated, wherein the color is designated on said display means.

16. A document processing apparatus comprising:

first setting means for setting a designated color for a designated one of a plurality of format elements;

second setting means for setting a designated color for a designated one of a plurality of area information;

memory means for storing the designated colors set by said first and second setting means;

priority setting means for setting which one of the colors stored in said memory means has a higher priority;

decision means for determining which of the colors stored in said memory means has higher priority based on the priority set by said priority setting means; and output means for outputting a character pattern in the color set for one of the plurality of format elements corresponding to the character pattern by said first setting means if that color has the higher priority as determined by said decision means, and for outputting a character pattern in the color set for one of the plurality of area information including the character pattern by said second setting means if that color has the higher priority as determined by said decision means.

17. A document processing apparatus according to claim 16, wherein the color information includes color information indicating a background color in the document information.

18. A document processing apparatus according to claim 16, wherein the format elements include body, headline, catchword and paginating.

19. A document processing apparatus according to claim 16, wherein said output means comprises a printer engine for printing a document.

20. A document processing apparatus according to claim 16, further comprising display means for displaying patterns of colors which can be designated, wherein the color is designated on said display means.

21. A document processing method comprising the steps of:

first setting a designated color for a designated one of the plurality of format elements;

second setting a designated color for a designated one of the area information;

setting which one of the format information and the area information has a higher priority;

determining which of the format information or the area information has higher priority based on the priority set in said priority setting step; and outputting a character pattern in a color set for one of the plurality of format elements corresponding to the character pattern in said first setting step if the format information has the higher priority as determined in said determining step, and for outputting a character pattern in a color set for one of the plurality of area information including the character pattern in said second setting step if the area information has the higher priority as determined in said determining step.

22. A document processing method according to claim 21, wherein the color information includes color information indicating a background color in the document information.

23. A document processing method according to claim 21, wherein the format elements include body, headline, catchword and paginating.

24. A document processing method according to claim 21, wherein said outputting step is performed using a printer engine for printing a document.

25. A document processing method according to claim 21, further comprising the step of displaying on a display means patterns of colors which can be designated, wherein the color is designated on the display means.

26. A document processing method comprising the steps of:

setting a designated color for a designated one of the plurality of format elements;

setting a designated color for a designated one of the plurality of area information;

storing the designated colors set in said first and second setting steps;

setting which one of the colors stored in said storing step has a higher priority;

determining which of the colors stored in said storing step has higher priority based on the priority set in said priority setting step; and outputting a character pattern in the color set for one of the plurality of format elements corresponding to the character pattern in said first setting step if that color has the higher priority as determined in said determining step, and for outputting a character pattern in the color set for one of the plurality of area information including the character pattern in said second setting step if that color has the higher priority as determined in said determining step.

27. A document processing method according to claim 26, wherein the color information includes color information indicating a background color in the document information.

28. A document processing method according to claim 26, wherein the format elements include body, headline, catchword and paginating.

29. A document processing method according to claim 26, wherein said outputting step is performed using a printer engine for printing a document.

30. A document processing method according to claim 26, further comprising the step of displaying on display means patterns of colors which can be designated, wherein the color is designated on the display means.

* * * * *

UNITED STATES PATENT AND TRADEMARK OFFICE
CERTIFICATE OF CORRECTION

PATENT NO. : 5,621,873
DATED : April 15, 1997
INVENTOR(S) : KENSAKU TANAKA ET AL.

It is certified that error appears in the above-identified patent and that said Letters Patent is hereby corrected as shown below:

Title page,

AT [57] ABSTRACT

Line 1, "e.g." should read --e.g.,--.

SHEET 5 OF 36

FIG. 5, "PRECEEDING" should read --PRECEDING--.

COLUMN 1

Line 15, "types" should read --type--.

COLUMN 2

Line 10, "outputted," should read --output,--.
Line 46, "FIG. 8" should read --FIG. 8B--.

COLUMN 3

Line 18, "FIGS. 12A-1 and 12A-2," should read --FIGS. 22A-1 and 22A-2,--.
Line 48, "of-character" should read --of character--.

COLUMN 7

Line 18, "thrown away." should read --rounded off.--.
Line 62, "actuating," should read --actuality,--.

UNITED STATES PATENT AND TRADEMARK OFFICE
CERTIFICATE OF CORRECTION

PATENT NO. : 5,621,873
DATED : April 15, 1997
INVENTOR(S) : KENSAKU TANAKA ET AL.

Page 2 of 2

It is certified that error appears in the above-identified patent and that said Letters Patent is hereby corrected as shown below:

COLUMN 14

Line 18, "performed the process of the" should read --of the process performed by the--.
Line 19, "existing 1" should read --existing--.

COLUMN 15

Line 65, "claim 1" should read --claim 1,--.

COLUMN 16

Line 1, "claim 1" should read --claim 1,--.
Line 48, "an" should read --can--.

Signed and Sealed this

Sixteenth Day of December, 1997

Attest:

BRUCE LEHMAN

*Attesting Officer*  *Commissioner of Patents and Trademarks*